(12) United States Patent
Gardner et al.

(10) Patent No.: US 12,180,343 B2
(45) Date of Patent: Dec. 31, 2024

(54) THERMOPLASTIC POLYMERS AND METHOD TO MAKE THEM

(71) Applicant: LUMAS Polymers LLC, Chaska, MN (US)

(72) Inventors: Thomas George Gardner, Anoka, MN (US); Thomas Fry, Victoria, MN (US); Luke Rodgers, Chaksa, MN (US)

(73) Assignee: LUMAS Polymers LLC, Chaska, MN (US)

(*) Notice: Subject to any disclaimer, the term of this patent is extended or adjusted under 35 U.S.C. 154(b) by 0 days.

(21) Appl. No.: 18/080,153

(22) Filed: Dec. 13, 2022

(65) Prior Publication Data
US 2023/0183429 A1 Jun. 15, 2023

Related U.S. Application Data

(60) Provisional application No. 63/289,465, filed on Dec. 14, 2021.

(51) Int. Cl.
 *C08J 3/00* (2006.01)
 *B29C 64/153* (2017.01)
 (Continued)

(52) U.S. Cl.
 CPC .............. *C08J 3/005* (2013.01); *B29C 64/153* (2017.08); *B33Y 10/00* (2014.12); *B33Y 70/00* (2014.12); *C08J 3/12* (2013.01); *C08J 2300/22* (2013.01)

(58) Field of Classification Search
 CPC ......... C08L 77/00; C08L 79/08; C08L 81/06; C08J 3/12; C08J 2300/22
 (Continued)

(56) References Cited

U.S. PATENT DOCUMENTS 3,065,205 A 11/1962 Bonner, Jr.
3,179,631 A 4/1965 Endry
(Continued)

FOREIGN PATENT DOCUMENTS

EP 0431924 A2 6/1991
EP 2316871 A1 5/2011
(Continued)

OTHER PUBLICATIONS

Aresta, M., et al., "Carbon Dioxide Recovery and Utilization," Springer Science & Business Media, 2003.
(Continued)

*Primary Examiner* — Fred M Teskin
(74) *Attorney, Agent, or Firm* — Young Basile Hanlon & MacFarlane, P.C.

(57) ABSTRACT

Polymer powders useful for additive manufacturing may be made by contacting carbon dioxide and a crystallizable polymer having at least one carbonyl, sulfur oxide or sulfone group; permeating the carbon dioxide into the polymer for a crystallizing time sufficient to induce crystallization forming an induced crystalized polymer; removing the carbon dioxide; and forming induced crystalized polymer particles having a D90 particle size of at most 300 micrometers and average particle size of 1 micrometer to 100 micrometers equivalent spherical diameter. The carbon dioxide is desirably supercritical carbon dioxide for at least a portion of the crystallizing time. The polymer powders upon heating during additive manufacturing may result in a polymer having less crystallinity or become amorphous.

18 Claims, 15 Drawing Sheets

(51) Int. Cl.
   *B33Y 10/00* (2015.01)
   *B33Y 70/00* (2020.01)
   *C08J 3/12* (2006.01)
(58) Field of Classification Search
   USPC .................................................. 528/483, 490
   See application file for complete search history.

(56) References Cited

U.S. PATENT DOCUMENTS

| | | | |
|---|---|---|---|
| 3,214,407 A | 10/1965 | Butterworth | |
| 3,249,588 A | 5/1966 | Gall | |
| 3,441,538 A | 4/1969 | Marks | |
| 3,442,857 A | 5/1969 | Thornton | |
| 3,516,966 A | 6/1970 | Berr | |
| 4,704,448 A | 11/1987 | Brugel | |
| 4,755,555 A | 7/1988 | Manwiller et al. | |
| 4,816,556 A | 3/1989 | Gay et al. | |
| 4,835,250 A | 5/1989 | Drent | |
| 4,853,462 A | 8/1989 | Hostetler et al. | |
| 4,894,435 A | 1/1990 | Drent | |
| 5,138,032 A | 8/1992 | Mastenbroek et al. | |
| 5,391,640 A | 2/1995 | Akkapeddi et al. | |
| 5,478,921 A * | 12/1995 | Roby ..................... | C08G 63/90 |
| | | | 528/495 |
| 5,597,589 A | 1/1997 | Deckard | |
| 6,136,948 A | 10/2000 | Dickens, Jr. et al. | |
| 6,177,518 B1 | 1/2001 | Lahijani | |
| 10,364,349 B1 | 7/2019 | Bertelo et al. | |
| 2008/0058494 A1 | 3/2008 | Shim et al. | |
| 2020/0325284 A1* | 10/2020 | Farrugia ................. | B29B 13/00 |
| 2021/0277180 A1 | 9/2021 | Gardner et al. | |
| 2021/0277192 A1 | 9/2021 | Gardner et al. | |

FOREIGN PATENT DOCUMENTS

| | | |
|---|---|---|
| WO | 9606881 A2 | 3/1996 |
| WO | 0138061 A1 | 5/2001 |
| WO | 2017033146 A1 | 3/2017 |

OTHER PUBLICATIONS

Beckman, E., et al., "Crystallization of bisphenol-A polycarbonate induced by supercritical carbon dioxide," J. Polym. Sci. B: Polym. Phys., vol. 25, pp. 1511-1517, (1987).
Budisa, N., et al., "Supercritical carbon dioxide and Its potential as a life-sustaining solvent in a planetary environment," Life, vol. 4, Issue 3, pp. 331-340, (2014).
Burke, A., et al., "Use of CO2 in Step-Growth Polymerizations: From Plasticized Polymer Melts to Solid State Polymerizations," ACS Polymer Preprints, vol. 38, Issue 2, pp. 387-388, (2014).
Cafiero, L., et al., "Microcellular foams from high performance miscible blends based on PEEK and PEI," Eur. Polym. J., vol. 78, pp. 116-128, (2016).
Chen, C., et al., "Using supercritical carbon dioxide in preparing carbon nanotube nanocomposite: Improved dispersion and mechanical properties," Polym. Composites, vol. 33, Issue 6, pp. 1033-1043, (2012).
Chiou, J. S., et al., "Plasticization of glassy polymers by CO2," J. Appl. Polym. Sci., vol. 30, Issue 6, pp. 2633-2642, (1985).
Chow, W. S. et al, "A. The Effect of Organoclay on the Mechanical Properties and Morphology of Injection-Molded Polyamide 6/Polypropylene Nanocomposites," J. Appl. Polym. Sci., vol. 91, Issue 1, pp. 175-189, (2003).
Cloarec, Thomas, "Processing and Characterization of Polycarbonate Foams With Supercritical CO2 and 5-Phenyl-1H-Tetrazole." Thesis prepared for Master of Science Degree, University of North Texas May 2015.
DeSimone, J. M., et al., "Green Chemistry Using Liquid and Supercritical Carbon Dioxide," Oxford University Press, New York, NY, 2003.

Givens, R. D., et al., "Synthesis of polyamides and polycarbonates using supercritical CO2," ACS Polym. Prepr., vol. 38, Issue 2, pp. 468-469, (2014).
Gross, S. M., et al., "Crystallization and solid-state polymerization of poly(bisphenol A carbonate) facilitated by supercritical CO2," Macromolecules, vol. 33, Issue 1, pp. 40-45, (2000).
Gross, Stephen M. et al., Odell, Peter G. et al., Synthesis and Swelling of Poly(bisphenol A carbonate) Using Supercritical CO2, Macromolecules 1998, 31, 9090-9092.
Handa, Y. P., et al., "Compressed-gas-induced crystallization in tert-butyl poly(ether ether ketone)," J. Polym. Sci. B Polym. Phys., vol. 39, Issue 13, pp. 1505-1512, (2001).
Handa, Y. P., et al., "Effect of thermal annealing and supercritical fluids on the crystallization behavior of methyl-substituted poly(aryl ether ether ketone)," Macromolecules, vol. 27, Issue 19, pp. 5511-5516, (1994).
Hu, D.-D., et al., "Microcellular foaming of polysulfones in supercritical CO2 and the effect of co-blowing agent," J. Supercrit. Fluids, vol. 140, pp. 21-31, (2018).
Kazarian, S., et al., "Specific Intermolecular Interaction of Carbon Dioxide with Polymers," J. Am. Chem. Soc., vol. 118, Issue 16, pp. 1729-1736, (1996).
Kendall, J. L., et al., "Polymerizations in Supercritical Carbon Dioxide," Chem. Rev., vol. 99, Issue 2, pp. 543-563, (1999).
Kepstan by Arkema and Kepstan PEKK Product Specification (4 pages), (Copyright 2018).
Kepstan PEKK material brochure (20 pages).
Liao, X., "Effect of Supercritical Carbon Dioxide on the Crystallization and Melting Behavior of Linear Bisphenol A Polycarbonate," J. Polym. B Polym. Phys., vol. 42, Issue 2, pp. 280-285, (2004).
Lundberg, J.L. et al., "Gaseous Polymer Solutions: Solubilities of Polydimethylsiloxane and Polypropylene in Carbon Dioxide and Viscosities of Polydimethylsiloxane in Carbon Dioxide." Georgia Institute of Technology, Atlanta School of Textile Engineering. Apr. 28, 1988. (26 pages).
Mercier, J. P., et al., "Some aspects of vapor?induced crystallization of polycarbonate of bisphenol A," J. Polym. Sci. C: Polym. Symp., vol. 16, Issue 4, pp. 2059-2067, (1967).
Monnereau, L., et al., "Gradient foaming of polycarbonate/carbon nanotube based nanocomposites with supercritical carbon dioxide and their EMI shielding performances," Polymer, vol. 59, pp. 117-123, (2015).
Monnereau, L., et al., "Supercritical CO2 and polycarbonate based nanocomposites: A critical issue for foaming," Polymer, vol. 55, Issue 10, pp. 2422-2431, (2014).
Muth, O., et al., "Polymer Modification by Supercritical Impregnation," J. Supercrit. Fluids, vol. 17, pp. 65-72, (2000).
Quigley, J. P., et al., "Enhanced electrical properties of polycarbonate/carbon nanotube nanocomposites prepared by a supercritical carbon dioxide aided melt blending method," Polymer, vol. 55, Issue 23, pp. 6167-6175, (2014).
Rindfleisch, F., et al., "Solubility of Polymers and Copolymers in Supercritical CO2," J. Phys. Chem., vol. 100, pp. 15581-15587, (1996).
Rosenberg, A., et al., "Opto-thermal characteristics of amorphous polyimides for optical applications," Optical Materials Express, vol. 8, No. 8, pp. 2159-2172, (2018).
Sawan, S. P., et al., "Evaluation of supercritical fluid interactions with polymeric materials," In Supercritical Fluid Cleaning: Fundamentals, Technology and Applications; William Andrew Publishing, Westwood, NJ, 1998, pp. 121-161.
Shieh, Y.-T., et al., "Interaction of supercritical carbon dioxide with polymers. I. Crystalline polymers," J. Appl. Polym. Sci., vol. 59, Issue 4, pp. 695-705, (1996).
Shieh, Y.-T., et al., "Interaction of supercritical carbon dioxide with polymers. II. Amorphous polymers," J. Appl. Polym. Sci., vol. 59, Issue 4, pp. 707-717, (1996).
Sorrentino, L., et al., "Polymeric foams from high-performance thermoplastics," Adv. Polym. Technol., vol. 30, Issue 3, pp. 234-243, (2011).
Su, Q. et. al, "Melt blending of polypropylene-blendpolyamide 6-blend-organoclay systems," Polym. Int., vol. 56, Issue 1, pp. 50-56, (2007).

(56) References Cited

OTHER PUBLICATIONS

Supercritical Fluids—Fundamentals and Applications, ISBN 978-0-7923-6236-4. "Polymer Phase Behavior: Todays Achievements and Tomorrows Needs." pp. 229-290, (Copyright 2000).

Tomasko, D.L., et al., "A review of CO2 applications in the processing of polymers," Ind. Eng. Chem. Res., vol. 42, Issue 25, pp. 6431-6456, (2003).

Vaganov, G., et al., "Investigation and Characterization of New Polyimide Powder for Selective Laser Sintering," Key Engineering Materials, vol. 822, pp. 208-214, (2019).

Wang, Dong, et al., "Effect of supercritical carbon dioxide on the crystallization behavior of poly(ether ether ketone)," J. Polym. Sci. B Polym. Phys., vol. 45, Issue 21, pp. 2927-2936, (2007).

Watanabe, M., et al., "Characterization of engineering plastics plasticized using supercritical CO2," Polymers, vol. 12, Issue 1, pp. 134-143, (2020).

International Search Report and Written issued in co-pending Application No. PCT/US2022/052678 mailed May 25, 2023 (19 pages).

Mizoguchi, K. et al., "CO2-induced crystallization of poly(ethylene terephthalate)", Polymer, Elsevier, Amsterdam, NL vol. 28, No. 8, Jul. 1, 1987 pp. 1298-1302. (5 pages).

Yu, Wenli et al., "Preparation of PLA microparticles by ASES technique", (2006) retrieved from STN, Abstract, Database accession No. 2006:826104.

Zhang, Lei et al, "-lactic acid) Crystallization in Pressurized Co2: An in siktu Microscopic Study and a New Model for secondary Nucleation in Supercritical CO2", The Journal of Physical Chemistry C, vol. 124, No. 16, Apr. 23, 2020, pp. 9021-9034 (20 pages).

* cited by examiner

THERMOPLASTIC POLYMERS AND METHOD TO MAKE THEM

FIELD

The invention is directed to the improvement of thermoplastic polymers for use to form shaped articles. In particular, the invention is directed to treating high performance/engineering thermoelastic plastics with supercritical carbon dioxide for use in additive manufacturing processes.

BACKGROUND

Powder-based methods of additive manufacturing include the following. Selective laser sintering (SLS) is a 3D-printing technique that uses a laser to fuse powder material in successive layers (see, for example, U.S. Pat. No. 5,597,589). High-speed sintering (HSS) and multi-jet fusion (MJF) 3D-printing employ multiple jets that similarly deposit successive layers of infrared-absorbing (IR-absorbing) ink onto powder material, followed by exposure to IR energy for selective melting of the powder layer. Electrophotographic 3D-printing employs a rotating photoconductor that builds the object layer-by-layer from the base.

Selective laser sintering (SLS), multi-jet fusion (MJF), and high-speed sintering (HSS) 3D-printing methods use the same type of free-floating, non-fixed powder bed. They generally have the same material requirements for compatibility with the printing process since the additively built object will experience similar stresses, only with different heating mechanisms to obtain the melt phase. Typically, a free-body diagram of a 3D printed object can be used to determine the residual stresses expected in the printed object. This is necessary for successfully building the object. If the residual stress is too high, the object will deform or be deformed beyond acceptable tolerances.

The residual stresses have typically been minimized for these powder bed-based 3D printers by using crystalline or semicrystalline thermoplastic polymers having sufficiently large window between its melting temperature and its recrystallization temperature. Unfortunately, this has limited the polymers that have successfully used to print large or complex parts using SLS and MJF methods (e.g., polyamides), thus limiting the use of these additive manufacturing methods. Likewise, the use of semi-crystalline polymers upon recrystallization after heating to make the additive manufactured article may limit the article's properties.

There have been examples of induced crystallization of polymers such as polycarbonate as described in U.S. Pat. Nos. 3,214,407 and 4,853,462; U.S. Pat. Publ. No. 2021/0277180, and PCT Pub. No. WO 2017/033146. These all used volatile organic solvents and the separation of the powder from solvent (e.g., precipitation) to form powders having induced crystallization. Unfortunately, the use of these solvents may limit the use of such polymer articles, for example, those requiring food contact.

Accordingly, it would be desirable to provide a thermoplastic polymer that avoids one or more problems to produce additive manufactured articles by methods such as SLS, HSS, MJF and the like such as those described above. In particular, it would be desirable to provide a thermoplastic polymer that may provide a high strength, tough, high temperature resistant, flame retardant and in some cases optically transparent articles from high performance polymers. It would also be highly desirable to provide amorphous additive manufactured articles comprised of such high performance polymers.

SUMMARY

Applicants have discovered a method that avoids volatile organic solvents that leaves any trace in or on the polymer. The method uses permeation of carbon dioxide (liquid or supercritical fluid) into the polymers to effectuate crystallization in the solid phase. Crystallizing in the solid phase has been discovered to allow the co-crystallization of polymer blends while maintaining the blend polymer distribution (e.g., avoids dissolution and precipitation that separates the blend polymers). It also has been discovered that additives that dissolve in the carbon dioxide may be permeated and incorporated into the polymer without heat or solvents allowing for unique blends such as incorporation of monomers or prepolymers that polymerize upon application of heat to form, for example, additive manufactured articles. The method may be used to induce crystallization in essentially amorphous polymers that when heated above their melt temperature and cooled below their glass transition temperature Tg revert to being amorphous. The method may also be used to further induce crystallization of semi-crystalline polymers, which upon heating above Tm and then cooled below their Tg revert to essentially the amount of crystallinity prior to the further induction of crystallization.

The method to realize the desired high performance polymer powders useful to make additive manufactured articles, includes: contacting carbon dioxide and a polymer having at least one carbonyl, sulfur oxide or sulfone group; permeating the carbon dioxide into the polymer for a crystalizing time sufficient to induce crystallization; removing the carbon dioxide; and forming induced crystalized polymer particles having a $D_{90}$ particle size of at most 300 micrometers and average particle size of 1 micrometer to 100 micrometers equivalent spherical diameter. The carbon dioxide is a liquid or supercritical fluid at least some portion of the crystalizing time.

The induced crystallized polymer particles may be used to additive manufacture an article by heating them to a temperature sufficient to melt and bond the polymer particles. The method is particularly useful for forming an article by additive manufacturing methods such as floating powder bed methods (e.g., SLS, HHS and MJF methods).

The induced crystallized polymer particles may be made into additive manufactured articles that take advantage of the properties of the wide range of engineering plastics. Examples of the applications the articles may be useful for include: biocompatible (medical), electrical, transportation (e.g., automotive, rail, trucking), plumbing, aerospace, food contact, industrial (e.g., machinery) and consumer (e.g., appliances) applications.

DETAILED DESCRIPTION

Figure 1:
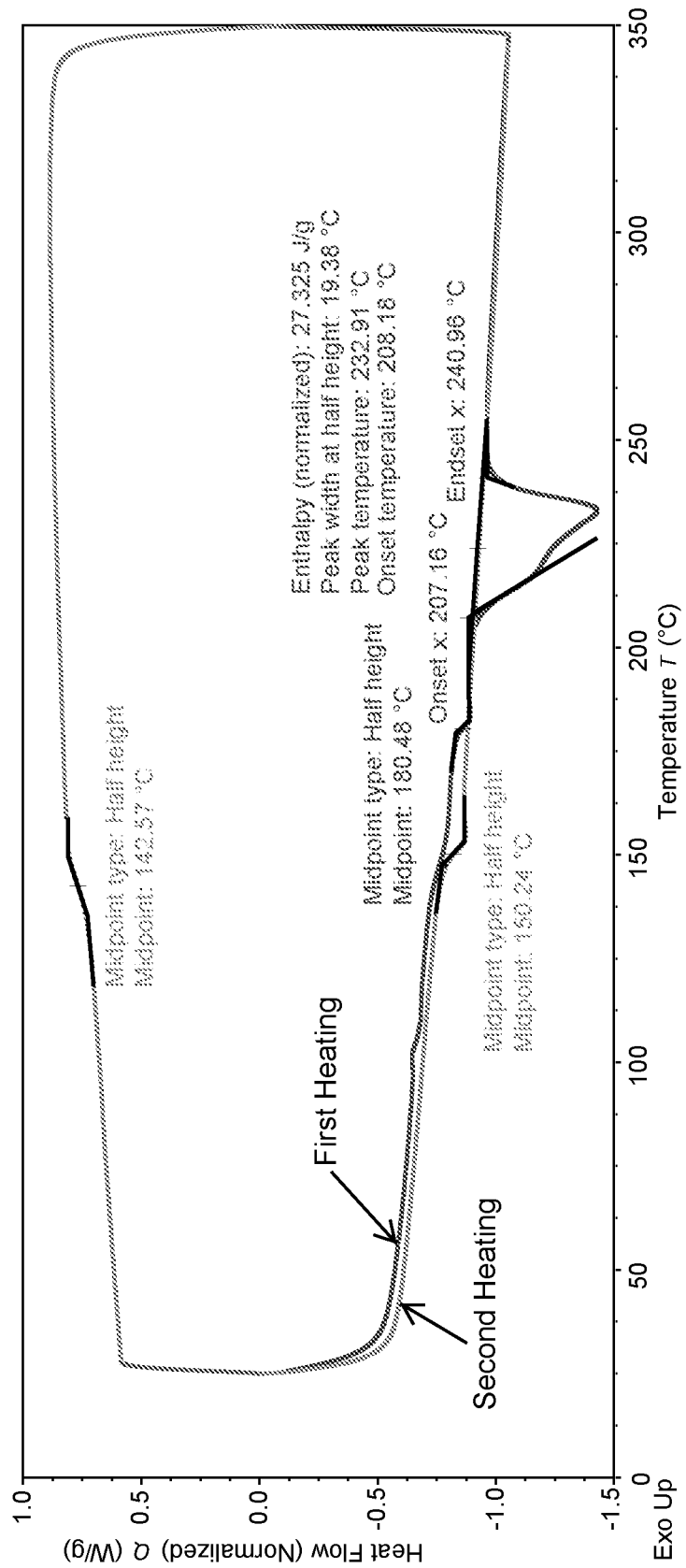
FIG. 1 is a differential scanning calorimetry (DSC) plot of a crystallizable polymer subjected to the method of this invention.
Figure 2:
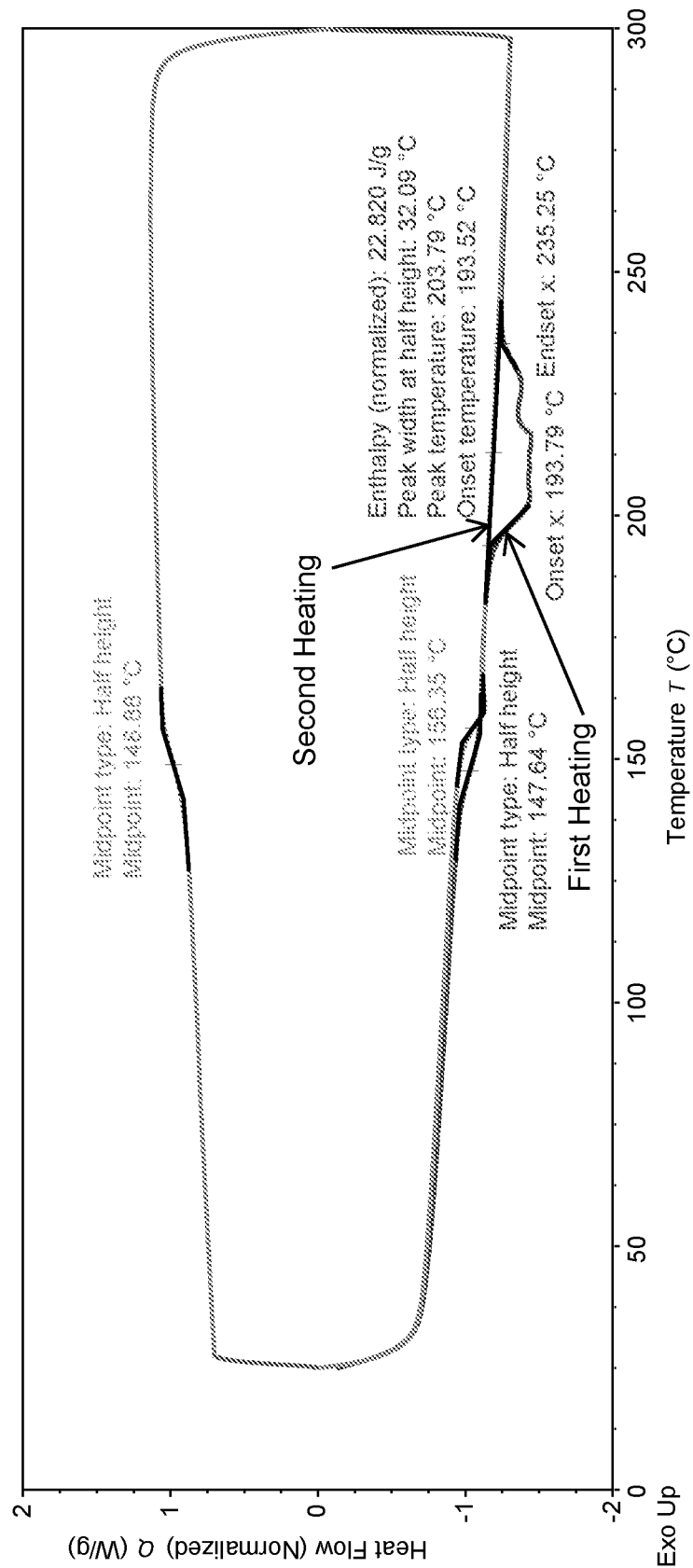
FIG. 2 is a DSC plot of a crystallizable polymer subjected to the method of this invention.
Figure 3:
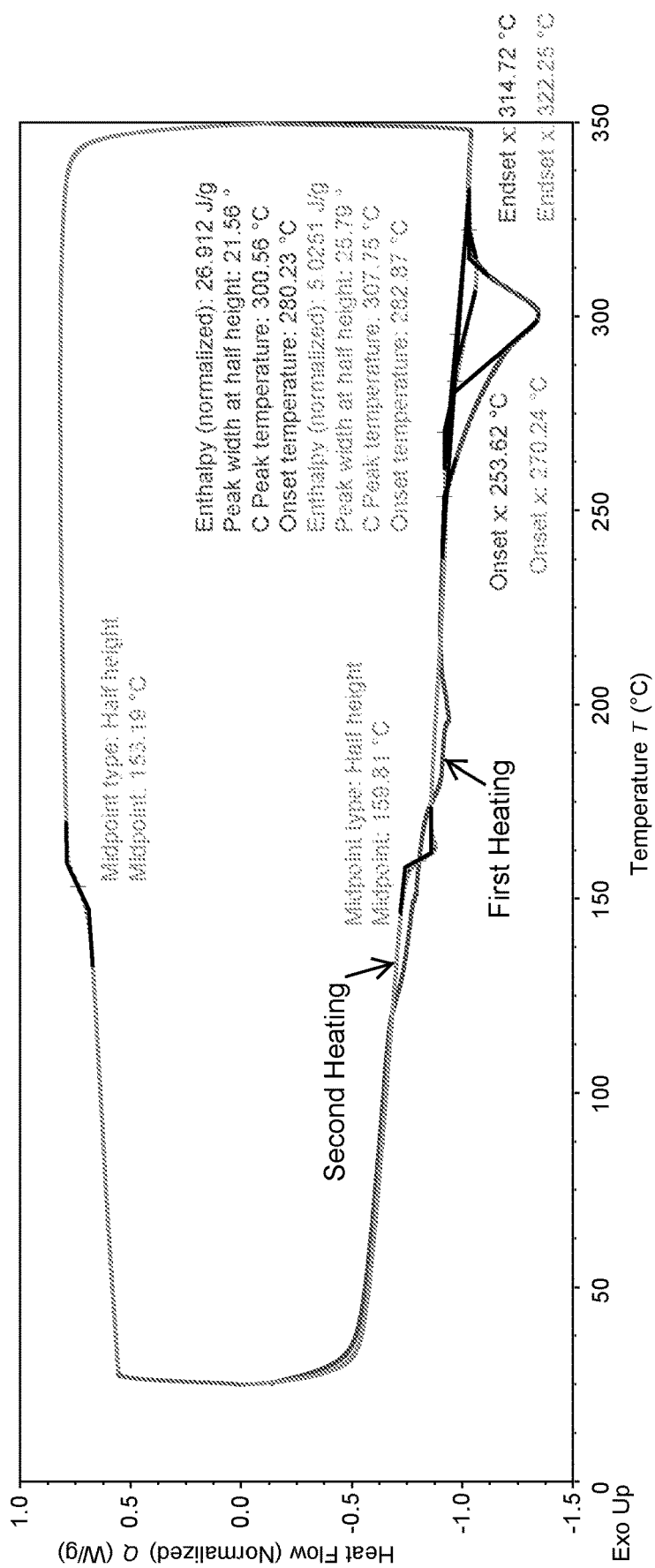
FIG. 3 is a DSC plot of a crystallizable polymer subjected to the method of this invention.
Figure 4:
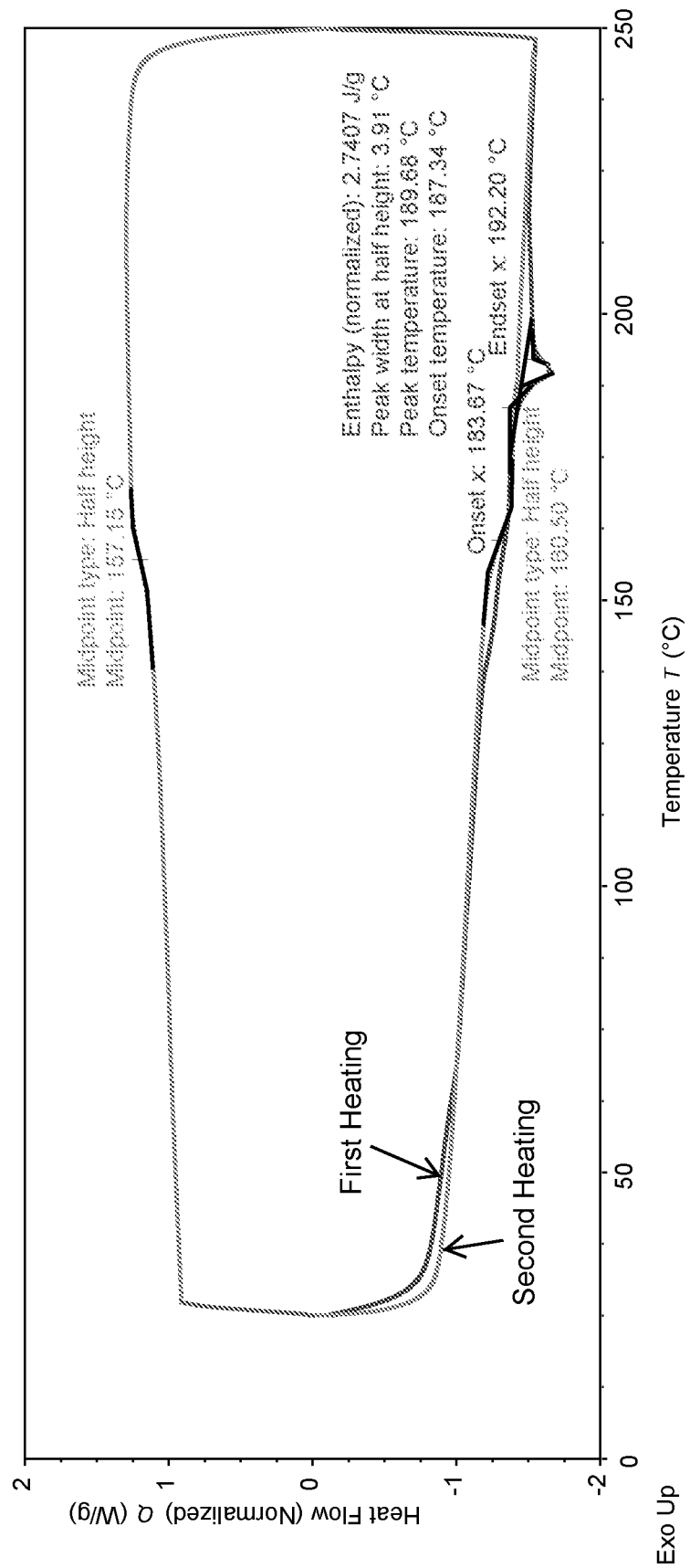
FIG. 4 is a DSC plot of a crystallizable polymer subjected to the method of this invention.
Figure 5:
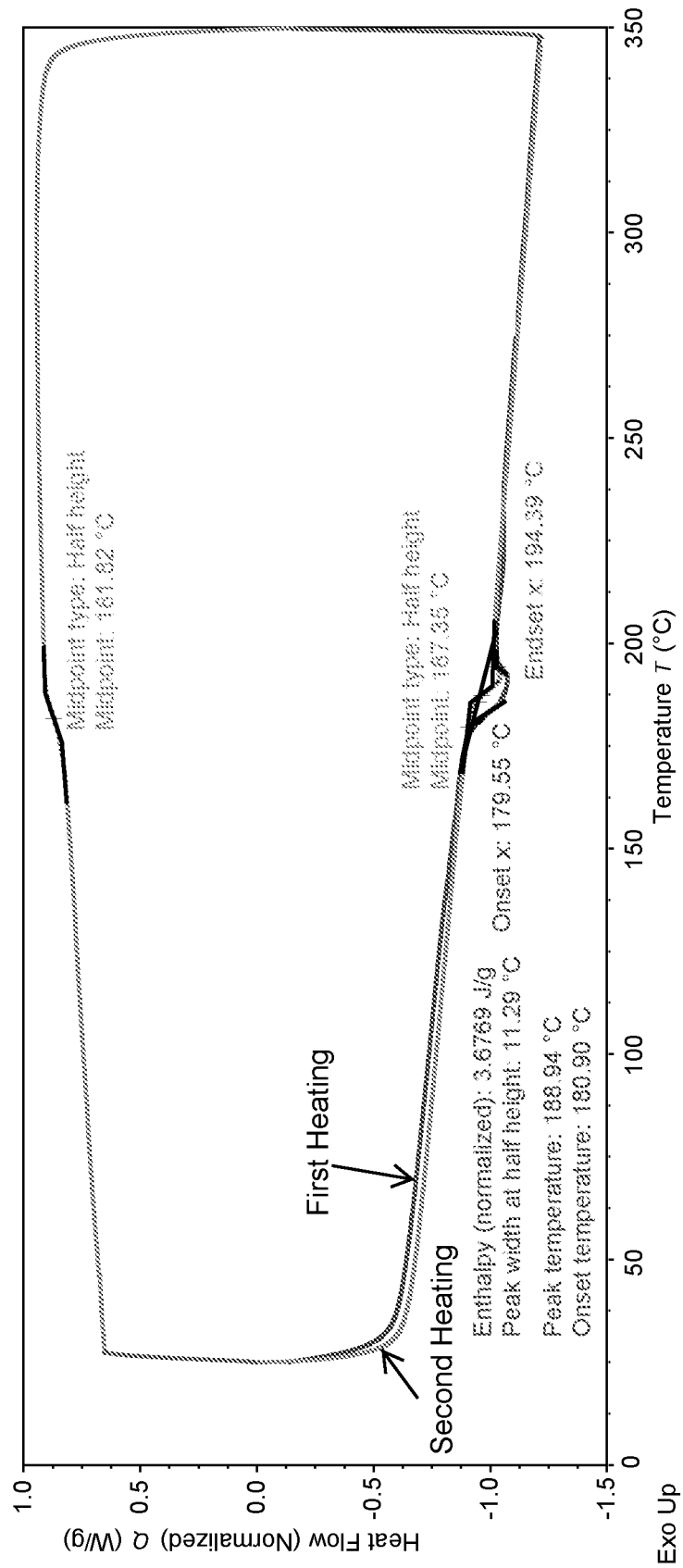
FIG. 5 is a DSC plot of a crystallizable polymer subjected to the method of this invention.
Figure 6:
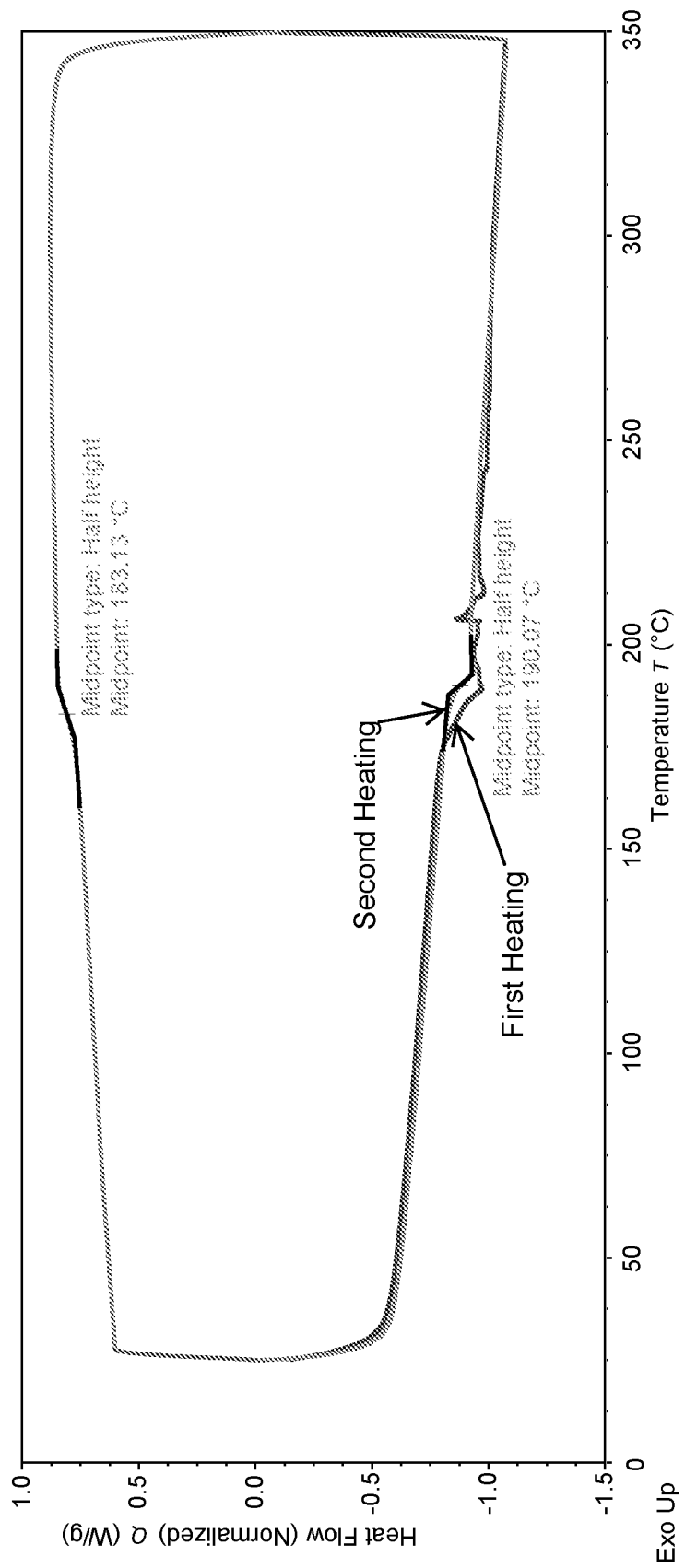
FIG. 6 is a DSC plot of a crystallizable polymer subjected to the method of this invention.
Figure 7:
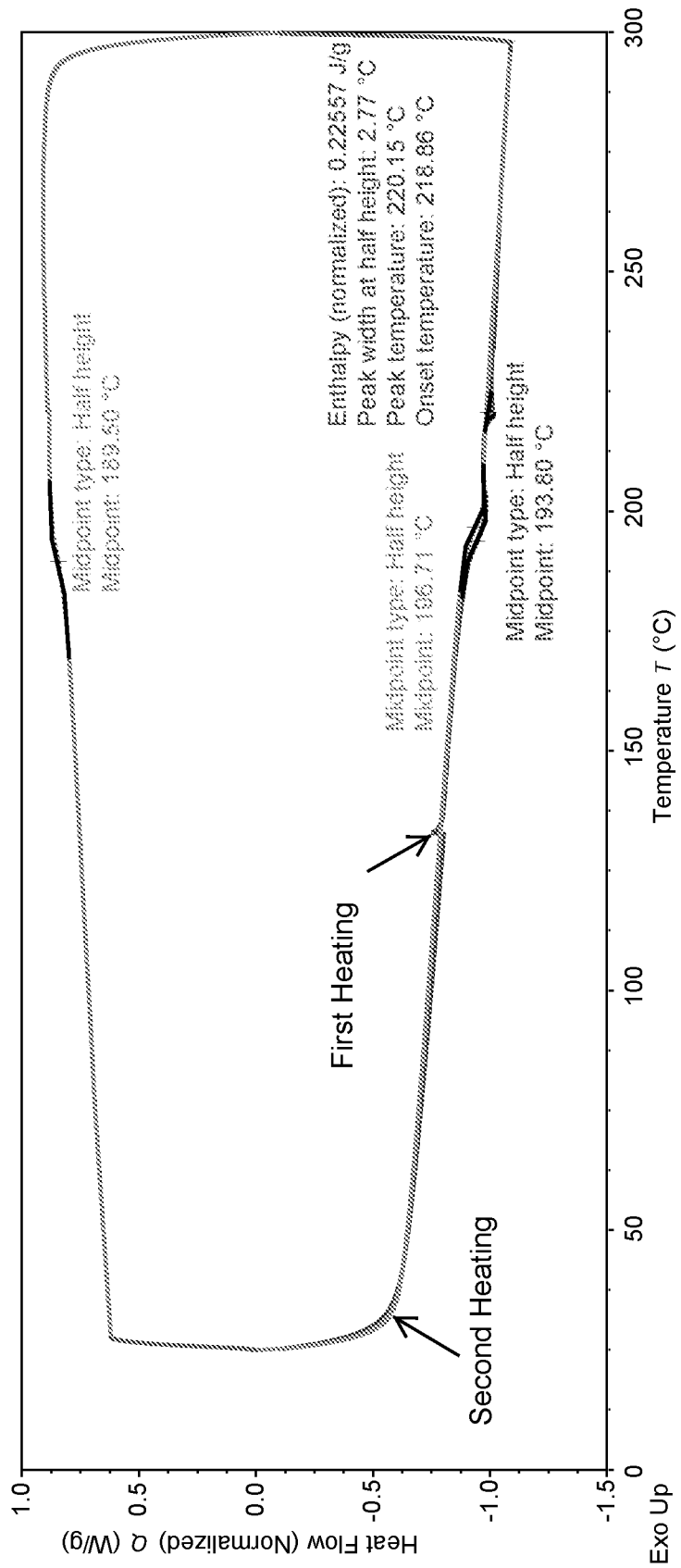
FIG. 7 is a DSC plot of a crystallizable polymer subjected to the method of this invention.
Figure 8:
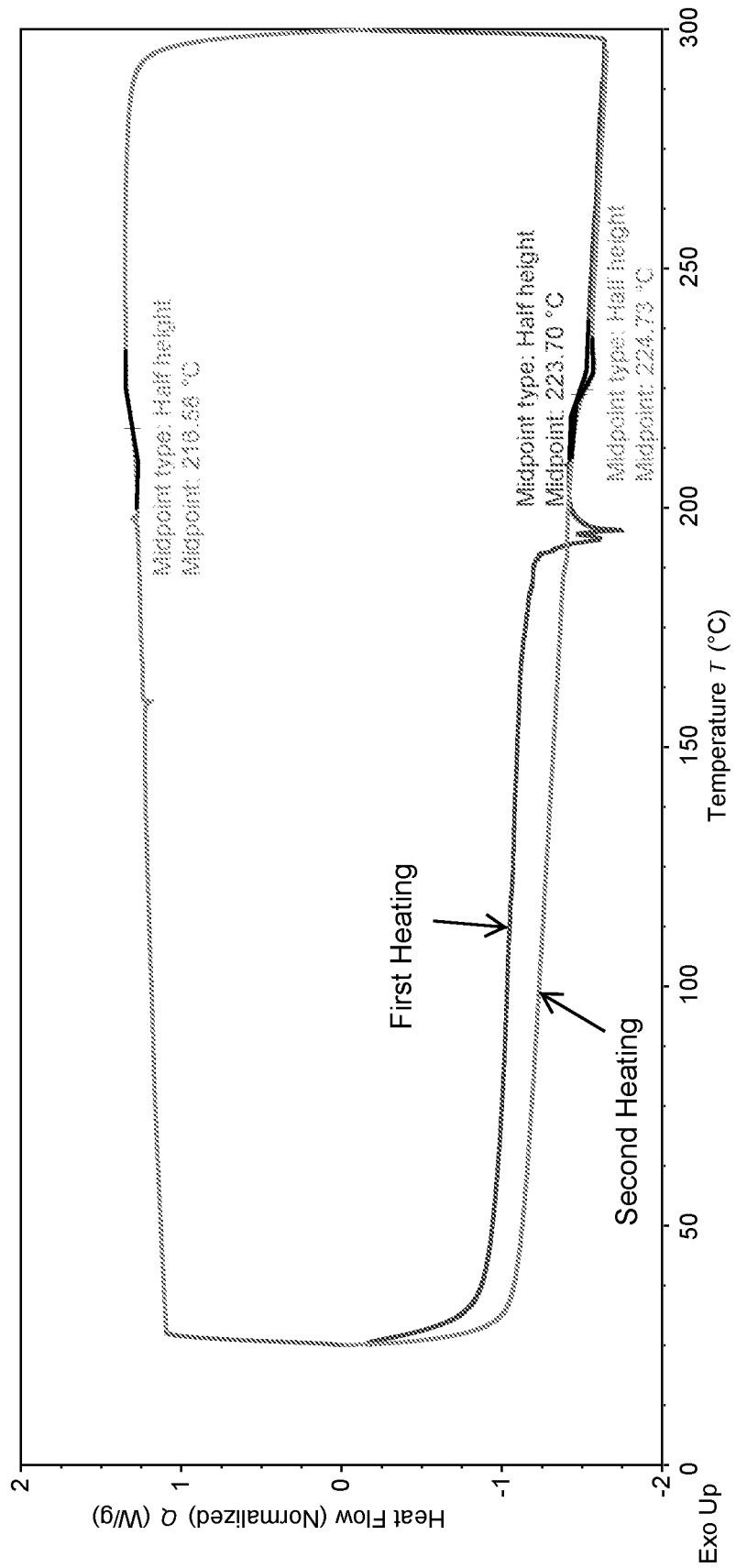
FIG. 8 is a DSC plot of a crystallizable polymer subjected to the method of this invention.
Figure 9:
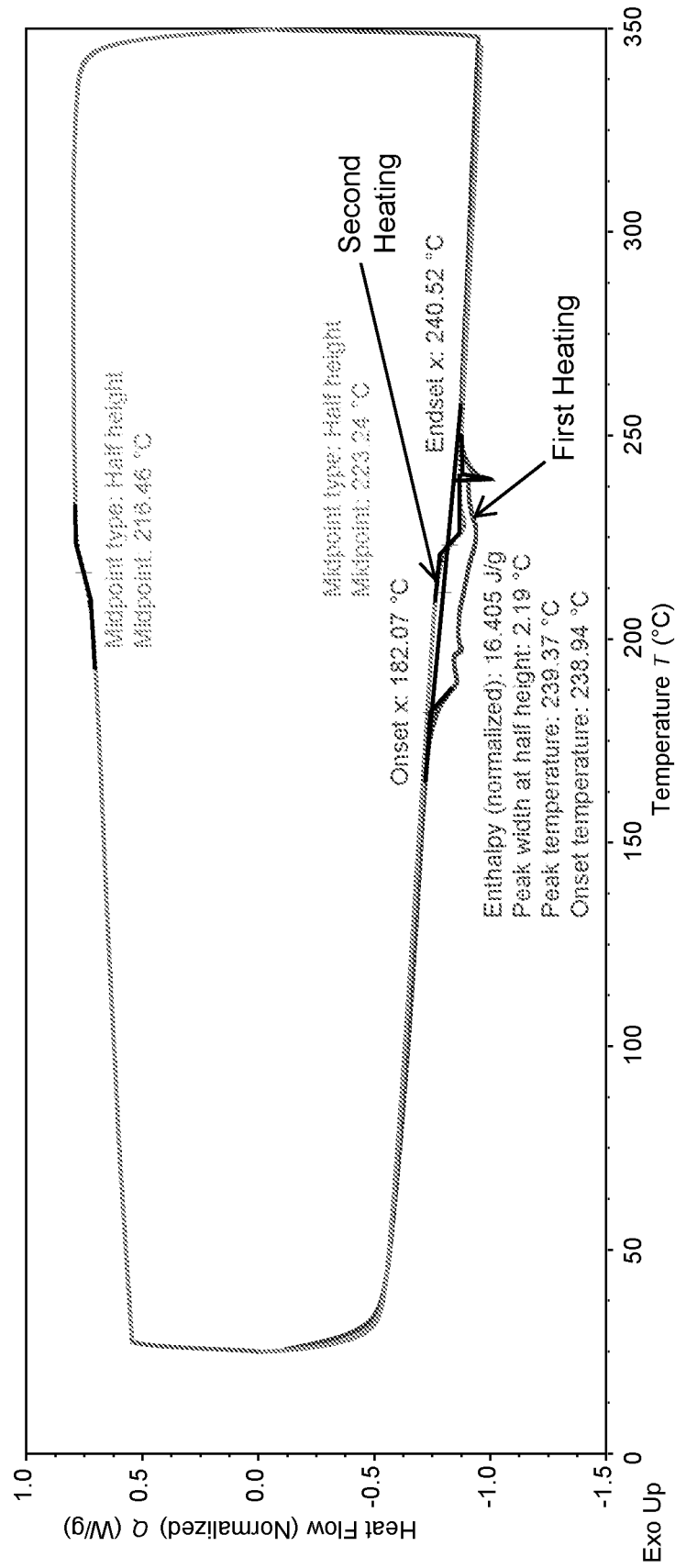
FIG. 9 is a DSC plot of a crystallizable polymer subjected to the method of this invention.
Figure 10:
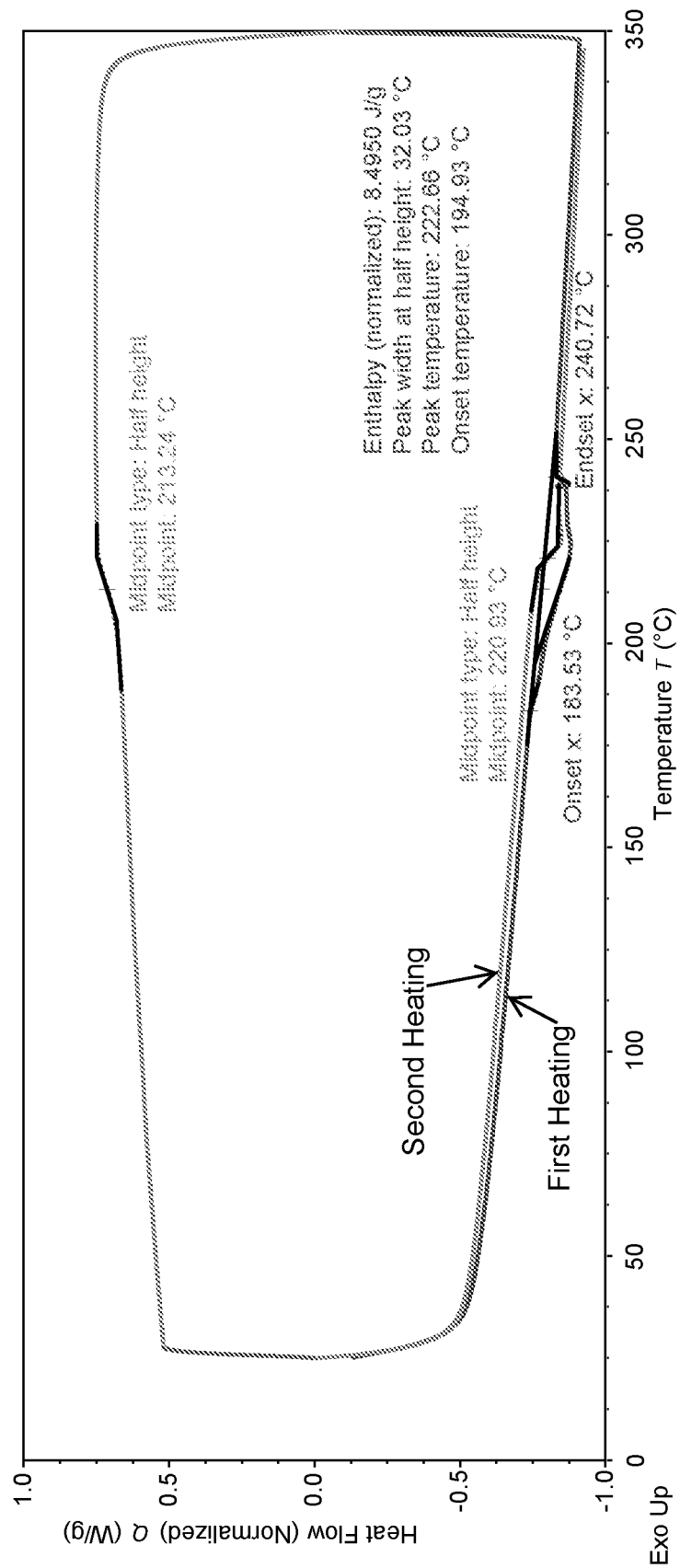
FIG. 10 is a DSC plot of a crystallizable polymer subjected to the method of this invention.
Figure 11:
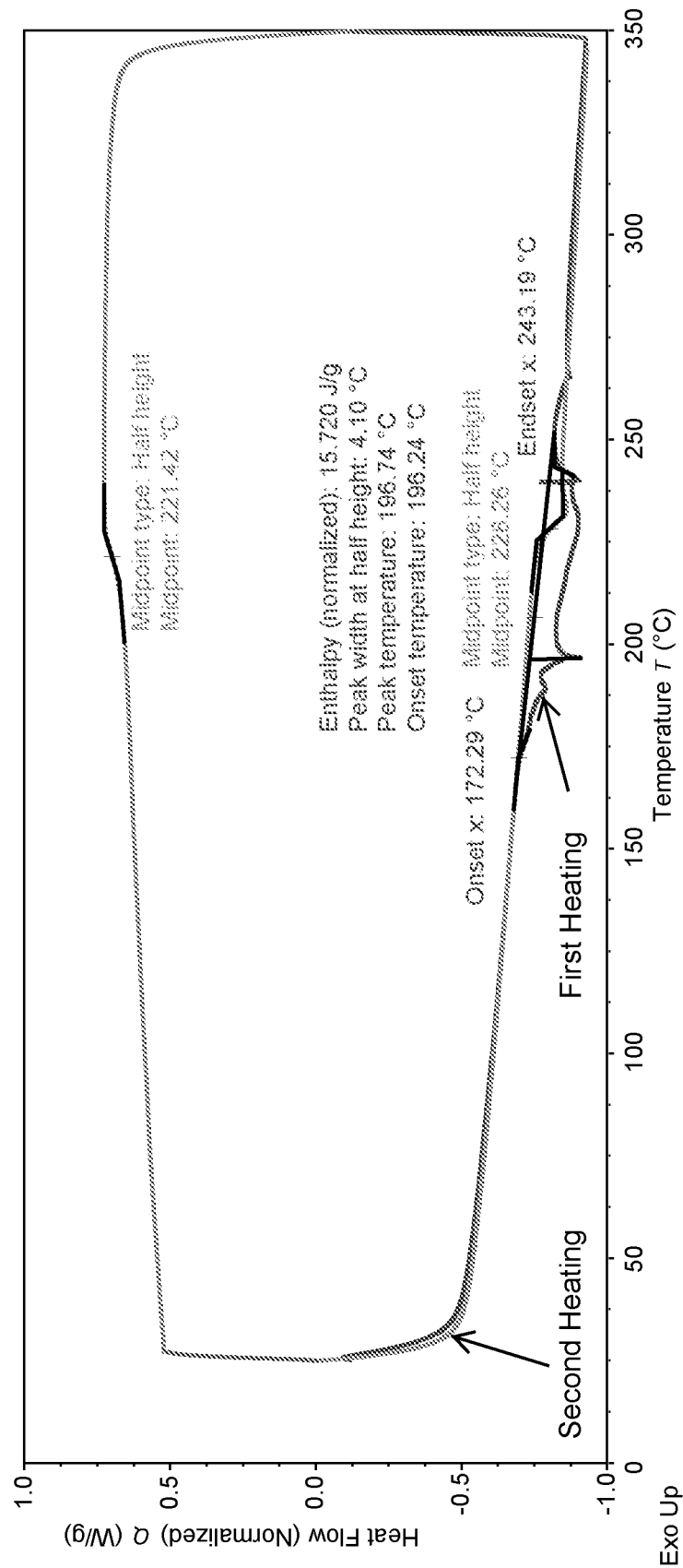
FIG. 11 is a DSC plot of a crystallizable polymer subjected to the method of this invention.
Figure 12:
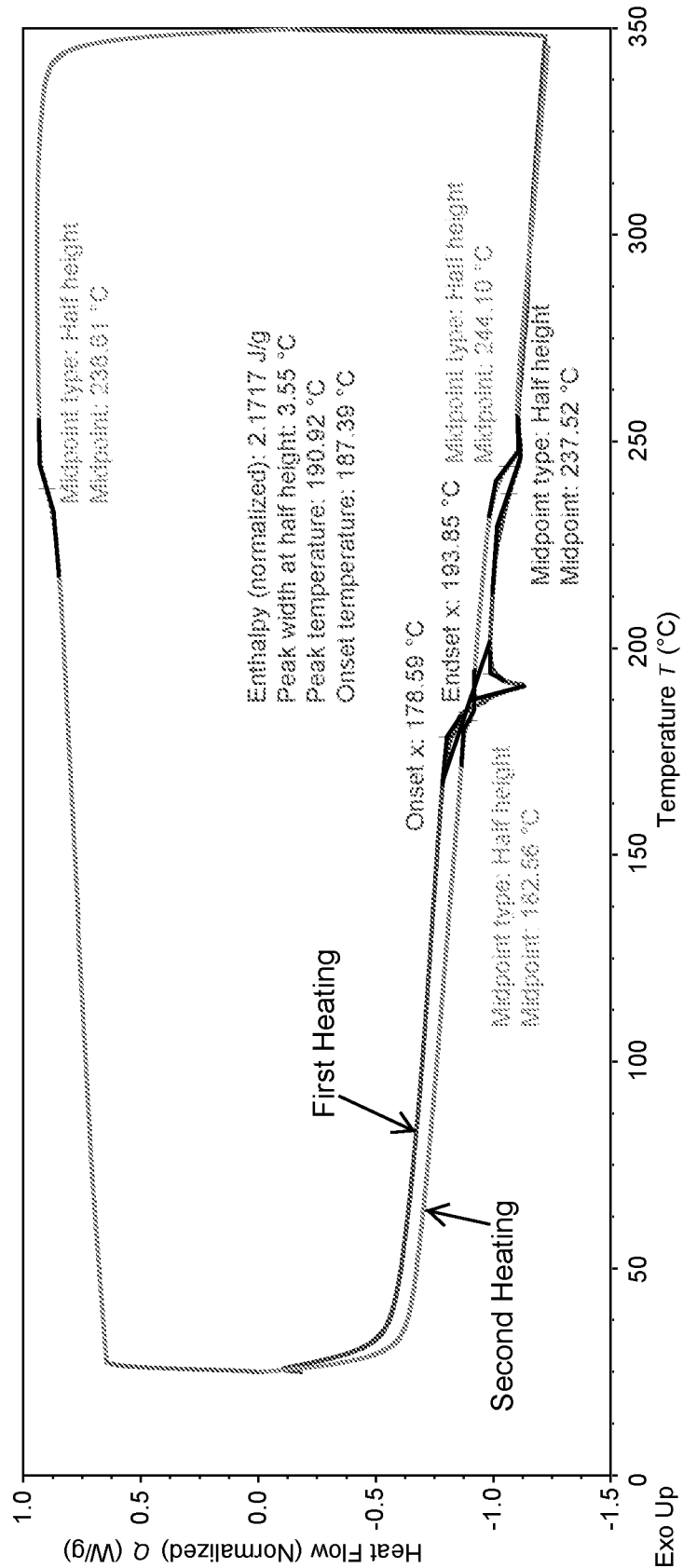
FIG. 12 is a DSC plot of a crystallizable polymer subjected to the method of this invention.
Figure 13:
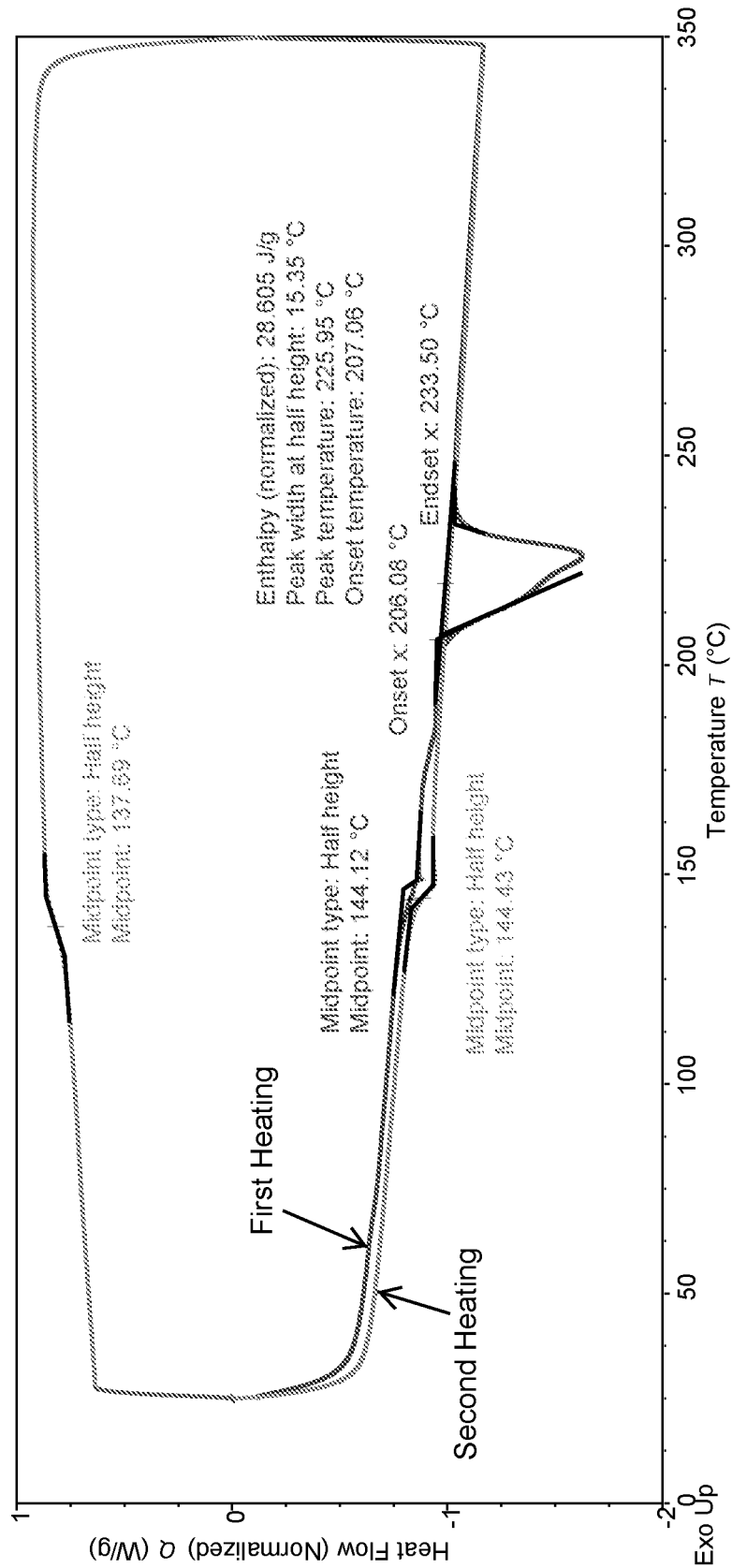
FIG. 13 is a DSC plot of a crystallizable polymer subjected to the method of this invention.

The explanations and illustrations presented herein are intended to acquaint others skilled in the art with the invention, its principles, and its practical application. The specific embodiments of the present disclosure as set forth are not intended to be exhaustive or limit the scope of the disclosure.

One or more as used herein means that at least one, or more than one, of the recited components may be used as disclosed. It is understood that the functionality of any ingredient or component may be an average functionality due to imperfections in raw materials, incomplete conversion of the reactants and formation of by-products.

The term "powder bed fusing" or "powder bed fusion" is used herein to mean processes wherein the induced crystalized polymer particles are selectively sintered or melted and fused, layer-by-layer to provide a 3-D object. Sintering can result in objects having a density of less than about 90% of the density of the solid powder composition, whereas melting can provide objects having a density of 90%-100% of the solid powder composition. Use of induced crystalized polymer particles can facilitate melting such that resulting densities can approach densities achieved by injection molding methods.

Powder bed fusing or powder bed fusion further includes all laser sintering and all selective laser sintering processes as well as other powder bed fusing technologies as defined by ASTM F2792-12a. For example, sintering of the powder composition can be accomplished via application of electromagnetic radiation other than that produced by a laser, with the selectivity of the sintering achieved, for example, through selective application of inhibitors, absorbers, susceptors, or the electromagnetic radiation (e.g., through use of masks or directed laser beams). Any other suitable source of electromagnetic radiation can be used, including, for example, infrared radiation sources, microwave generators, lasers, radiative heaters, lamps, or a combination thereof. In certain embodiments, selective mask sintering ("SMS") techniques can be used to produce three-dimensional objects. For further discussion of SMS processes, see for example U.S. Pat. No. 6,531,086, which describes an SMS machine in which a shielding mask is used to selectively block infrared radiation, resulting in the selective irradiation of a portion of a powder layer. If using an SMS process to produce objects from powder compositions of the present technology, it can be desirable to include one or more materials in the powder composition that enhance the infrared absorption properties of the powder composition. For example, the powder composition can include one or more heat absorbers or dark-colored materials (e.g., carbon black, carbon nanotubes, or carbon fibers).

Also included herein are all three-dimensional objects made by powder bed fusing compositions including the partially crystalline polycarbonate powder described herein. After a layer-by-layer manufacture of an object, the object can exhibit excellent resolution, durability, and strength. Such objects can include various articles of manufacture that have a wide variety of uses, including uses as prototypes, as end products, as well as molds for end products.

In particular, powder bed fused (e.g., laser sintered) objects can be produced from the induced crystalized polymer particles using any suitable powder bed fusing processes including laser sintering processes. These objects can include a plurality of overlying and adherent sintered layers that include a polymeric matrix which, in some embodiments, can have reinforcement particles dispersed throughout the polymeric matrix. Laser sintering processes are known and are based on the selective sintering of polymer particles, where layers of polymer particles are briefly exposed to laser light and the polymer particles exposed to the laser light are thus bonded to one another. Successive sintering of layers of polymer particles produces three-dimensional objects. Details concerning the selective laser sintering process are found, by way of example, in the specifications of U.S. Pat. No. 6,136,948 and WO 96/06881. However, the induced crystalized polymer particles described herein can also be used in other rapid prototyping or rapid manufacturing processing of the prior art, in particular in those described above. For example, the induced crystalized polymer particles can in particular be used for producing moldings from powders via the SLS (selective laser sintering) process, as described in U.S. Pat. No. 6,136,948 or WO 96/06881, via the SIB process (selective inhibition of bonding of powder), as described in WO 01/38061, via 3D printing, as described in EP 0 431 924.

The crystallizable polymer is one that has a repeating unit comprised of one or more of a carbonyl, sulfur dioxide, and sulfone group. The carbonyl group may be a part of a carbonate, ester, amide, or imide in the crystallizable polymer. The crystallizable polymer may have one or more other repeating units such as an ether. Examples of useful high performance polymers include polyamides, polycarbonates, polyketones, polysulfones, polyarylates and polyimides. The crystallizable may be linear or branched. The crystallizable polymer may be aliphatic or aromatic with it desirable for the polymer to have at least a portion of said polymer comprised of repeating aromatic units within the polymer backbone, where it generally is desirable for at least about 50% by mole of the polymer to be aromatic (i.e., aromatic groups make up 50% or more of the molar mass of the polymer).

Examples of useful polycarbonates include those described in paragraphs 49 to 56 of U.S. Pat. Publ. No. 2021/0277192, incorporated herein by reference.

Examples of useful polysulfones may include polyarylethersulfones (PAES) which may be represented by:

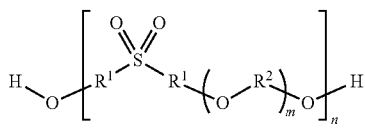

(1)

wherein n is any integer value that gives rise to the PAES having an weight average molecular weight ($M_w$) anywhere from 1, 10, or 20 to 1000, 500 or 200 kDa, m typically varies from 0 to 10, each occurrence of $R^1$ represents an aromatic ring or fused rings of about 5-10 carbon atoms, such as but not limited to: 1,2-, 1,3-, or 1,4-phenylene, or a diphenylene such as but not limited to 4,4'-diphenylene, and each occurrence of $R^2$ is independently $C_1$-$C_{20}$ alkyl, $C_5$-$C_{18}$ or $C_5$-$C_{12}$ aromatic ring or fused rings consisting of 5-10 carbon atoms, or a combination thereof. The fragment structure —$R^1$—S($=$O)$_2$—$R^1$— may also represent either of the fused heterocyclic ring structures shown in formulas 2 and 3; and wherein at least 60% of the total number of $R^1$ groups are aromatic, or each $R^2$ contains at least one $C_{6-30}$ aromatic group. The fragment structure —$R^1$—S($=$O)$_2$—$R^1$— may also represent either of the fused heterocyclic ring structures shown in formulas 2 and 3:

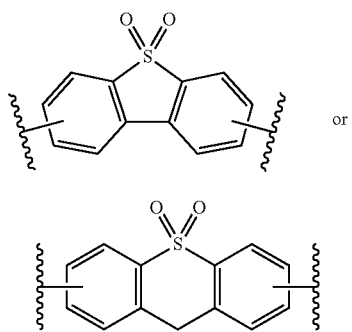

(2)

or (3)

In an embodiment $R^1$ and $R^2$ may be the residue of an aryl or diaryl compound:

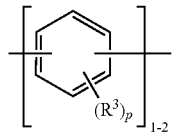

(4)

In another embodiment, the PAES of formula (1), m has an integer value greater than or equal to zero (typically from 1 to 10, 6, 5, 4, 3, or 2), and each $R^2$ is a residue of a dihydroxy compound such as an aromatic dihydroxy compound:

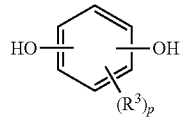

(5)

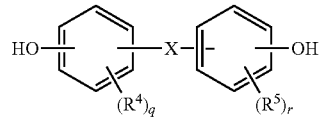

(6)

In formulas (3), (4), and (5), each $R^3$, $R^4$, and $R^5$ is independently, for example, but not limited to: a halogen atom (e.g., chlorine or bromine), a $C_{3-20}$ alkoxy, a $C_{1-20}$ hydrocarbyl group (e.g., a $C_{1-20}$ alkyl, a halogen-substituted $C_{1-10}$ alkyl, a $C_{6-10}$ aryl, or a halogen-substituted $C_{6-10}$ aryl); and p, q, and r are each independently integers of 0 to 4, such that when p, q, or r is less than 4, the valence of each unsubstituted carbon of the ring is filled by hydrogen; and X represents a bridging group connecting the two phenolic groups, where the bridging group and the hydroxy substituent of each $C_6$ arylene group are disposed ortho, meta, or para (preferably para) to each other on the $C_6$ arylene group, and the X group consists of, for example: a single bond; —O—; —S—; —S($=$O)—; —S($=$O)$_2$— (e.g., bisphenol-S); —C($=$O)—; or a $C_1$-20 organic group, which can be cyclic or acyclic, aromatic or non-aromatic, and can further comprise heteroatoms such as: halogens; oxygen; nitrogen; sulfur; silicon; or phosphorous.

Specific dihydroxy compounds include but are not limited to: resorcinol; 2,2-bis(4-hydroxyphenyl)propane ("bisphenol A" or "BPA", in which in which each of aryl rings is para-substituted and X is isopropylidene in formula (3)); 3,3-bis(4-hydroxyphenyl)-phthalimidine; 2-phenyl-3,3-bis(4-hydroxyphenyl)phthalimidine (also known as "N-phenyl phenolphthalein bisphenol", "PPPBP", or 3,3-bis(4-hydroxyphenyl)-2-phenylisoindolin-1-one); 1,1-bis(4-hydroxy-3-methylphenyl)cyclohexane; 1,1-bis(4-hydroxy-3-methylphenyl)-3,3,5-trimethylcyclohexane (also known as "isophorone bisphenol").

Examples of polyarylethersulfones that are suitable may any one or more of:

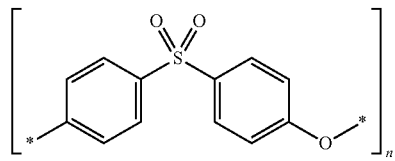

(7)

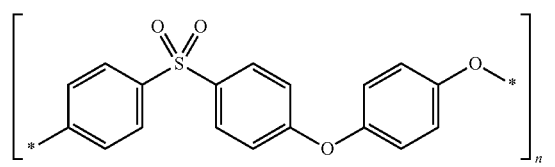

(8)

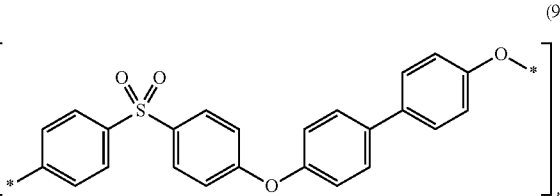

(9)

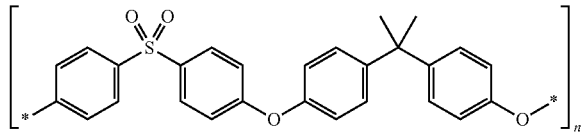

Examples of useful PAES polymers are: polyethersulfone (PSU, CAS #25667-42, formula 7), poly(1,4-phenylene-ether-ether-sulfone (PES or PEES, CAS #28212-68-2, formula 8), polyphenylenesulfone (PPSU, CAS #25839-81-0, formula 9) and poly(bisphenol-A sulfone) (PSF, CAS #25135-51-7, formula 10), such as are available under the tradenames RADEL from Curbel Plastics Inc., Arlington Tex., PARYLS from UJU New Materials, Ltd., and UDEL from Solvay Specialty Polymers USA, LLC, Alpharetta, GA.

The crystallizable polymer may be polyketone including polyketones having ether repeating units such as polyetherketone, polyetheretherketone, polyetherketoneketone. An exemplary polyketone without ether repeating units may be formed by the reaction of carbon monoxide, an alkene monomer in the presence of a group 8 to 10 transition metal catalyst. In particular, the method may be any one of those described in U.S. Pat. Nos. 4,835,250; 4,894,435 and 5,138,032 and US Pat. Publ. No. 2008/0058494 each incorporated by reference in its entirety. In particular, the method, reaction conditions and monomers are those described in U.S. Pat. No. 5,138,032 from col. 2 line 52 to col. 5, line 17 specifically incorporated herein by reference. Such polyketones are typically comprised of repeating units represented by

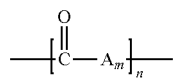

where A is the residue of an alkene monomer converted to a saturated hydrocarbon group, m is from about 1 to 6 and n is at least about 2 to any practicable amount to realize the desired number average molecular weight (Mn) useful in the invention. Desirably, the alkene monomer is comprised of an olefin having from 2 to 12, 8 or 6 carbons. Illustratively, the alkene monomer is ethylene or the alkene monomer comprises ethylene and at least one other olefin monomer such as propylene. When the polyketone is a copolymer of ethylene and another olefin monomer (e.g., propylene), the amount of ethylene and other olefin is as described in U.S. Pat. No. 5,138,032 from col. 2, line 17 to col. 3, line 14. The polyketone desirably is one that is a terpolymer of carbon monoxide, ethylene and another alkene monomer (e.g., olefin of 3 to 12, 8 or 6 carbons and in particular propylene). Such polyketone may be represented by random repeating units:

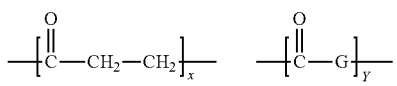

Where G is the saturated residue of an olefin of 3 to 12, 8 or 6 carbons polymerized through the double bond and x/y is at least 2 to 100 or 50 or 20. Desirably, G is propylene. The polyketone may be terminated by any useful group such as alkyl group, hydroxyl, ester, carboxylic acid, ether or combination thereof. The particular terminating group may arise from using a solvent such as a low molecular alcohol such as methanol or water or combination thereof. Examples of commercially available polyketones include those available under the tradename POKETONE from Hyosung, Korea.

Generally, the polyketone may be a polyaryletherketone (PAES) such as those known in the art. Illustratively, the PAES may be polyetherketoneketone (PEKK) such as those known in the art and in particular amorphous PEKK as described from col. 2, line 13 to 55 of U.S. Pat. No. 10,364,349, incorporated herein by reference. PEKKs may be made by known methods such as those described in U.S. Pat. Nos. 3,065,205; 3,441,538; 3,442,857; 3,516,966; 4,704,448; 4,816,556 and 6,177,518.

The polyamide may be any of those known in the art and commonly are semi-crystalline as described from col. 4, line 7 to col. 5, line 22 of U.S. Pat. No. 5,391,640, incorporated herein by reference. In particular, the polyamide may be amorphous as described from col. 5, line 23 to col. 8, line 12 of U.S. Pat. No. 5,391,640, incorporated herein by reference. Examples of conventional polyamides include polypyrrolidone (nylon 4), polycaprolactam (nylon 6), polyheptanolactam (nylon 7), polycaprylactam (nylon 8), polynonanolactam (nylon 9), polyundecaneolactam (nylon 11), polydodecanolactam (nylon 12), poly(tet-ramethylenediamine-co-oxalic acid) (nylon 4,2), poly(-tetramethylenediamine-co-adipic acid) (nylon 4,6), poly(tetramethylenediamine-co-isophthalic acid) (nylon 4,1), polyhexamethylene azelaiamide (nylon 6,9), polyhexamethylene sebacamide (nylon 6,10), polyhexa-5 methylene isophthalamide (nylon 6,IP), polymetaxyly-lene adipamide (nylon MXD6), the polyamide of n-dodecanedioic acid and hexamethylenediamine (nylon 6,12), the polyamide of dodecamethylenediamine and n-dodecanedioic acid (nylon 12,12), as well as copoly-10 mers thereof which include: hexamethylene adipamide-caprolactam (nylon 6,6/6), hexamethylene adipamide/-hexamethylene-isophthalamide (nylon 6,6/61P), hexa-methylene adipamide/hexamethylene-terephthalamide (nylon 6,6/6T), trimethylene adipamide-hexamethy-15 lene-azelaicamide (nylon trimethyl 6,2/6,2), and hexa-methylene adipamide-hexamethylene-azelaicamide caprolactam (nylon 6,6/6,9/6) as well as others which are not particularly delineated here.

The polyimide may be any of those known in the art and desirably are known aromatic polyimides. Illustratively, Aromatic polyimides that may be suitable are described in U.S. Pat. Nos. 3,179,631; 3,249,588 and 4,755,555, each incorporated herein by reference. More particularly, the polyimide is amorphous such as those described by A. Rosenberg, et. al., in *Optical Materials Express* Vol. 8, No. 8, 1 Aug. 2018, 2159.

The crystallizable polymer may be in any useful size and shape when contacted with carbon dioxide, but desirably is of a size that maximizes the permeation rate and crystallization inducement rate balanced with downstream processes (e.g., formation of the induced crystallized polymer particles) or other reason, such as imparting a gradient structure in an article comprised of the crystallizable polymer. Illustratively, the crystallizable polymer has a size where the smallest dimension is from about 1 micrometer, 10 micrometer, 100 micrometer or 1 millimeter to 20 mm, 15 mm, 10 mm or 5 mm with the largest dimension typically being 2×, 5×, 10× to 100× of the aforementioned smallest dimension. Typically, the crystallizable polymer is in the form a bead, powder, or chopped fiber.

The crystallizable polymer may be a powder having a particle size and characteristics that are maintained during the method to form the induced crystallized polymer particles and are useful for additive manufacturing. The crystallizable polymer or induced crystallized polymer may be comminuted to a desired size for use in a particular additive manufacturing method such as SLS. Illustratively, the crystallizable polymer or induced crystallized polymer may be comminuted and classified such that it has a particle size that is useful for making additive manufactured articles (e.g., forms the induced crystalized polymer particles), and typically has a median particle size ($D_{50}$), by volume, from about 1 micrometer ($\mu m$), 10 $\mu m$, 20 $\mu m$ or 30 $\mu m$ to 150 $\mu m$, 125 $\mu m$, 100 $\mu m$ or 90 $\mu m$. Likewise, to enable consistent heating and fusion of the powder, it desirably has a $D_{90}$ of at most 300 $\mu m$, 200 $\mu m$ or 150 $\mu m$ and a $D_{10}$ of at least 0.1 $\mu m$, 0.5 $\mu m$ or 1 $\mu m$ by volume. $D_{90}$ means the particle size (equivalent spherical diameter) in the particle size distribution, where 90% by volume of the particles are less than or equal to that size; similarly, $D_{50}$ means the particle size (equivalent spherical diameter) in the particle size distribution, where at least 50% by volume of the particles are less than that size, and $D_{10}$ means the particle size (equivalent spherical diameter) in the particle size distribution, where at least 10% by volume of the particles are less than that size. The particle size may be determined by any suitable method such as those known in the art including, for example, laser diffraction or image analysis of micrographs of a sufficient number of particles (~100 to ~200 particles). A representative laser diffractometer is one produced by Microtrac such as the Microtrac S3500.

The comminution may be carried out by any suitable method such as those known in the art. Illustratively, milling at a temperature where the semi-crystalline polymer becomes embrittled may be used such as commonly referred to as cryomilling. Generally, the temperature for cryomilling may be any temperature below about 0° C., −25° C., −50° C. to about −75° C., −100° C., −150° C., or −190° C. The cooling may be provided any suitable method or means such as using dry ice or liquid nitrogen.

The contacting may be accomplished by any suitable method such as those known in the arts, for example, to extract oils from plants such as the extraction of caffeine from coffee beans. In essence, the crystallizable polymer and carbon dioxide may be loaded into a reactor and pressurized to a pressure and heated to temperature where carbon dioxide is a liquid or supercritical fluid to effectuate the permeation and inducement of crystallization.

The crystallizable polymer may be homopolymer or a blend of polymers with at least one of them being a crystallizable polymer. The crystallizable polymer may be a blend of crystallizable polymers. The method realizes the co-crystallization of polymer blends while maintaining the blend polymer distribution (i.e., avoids dissolution and precipitation that separates the blend polymers).

Generally, the pressure may be any that is sufficient for the carbon dioxide to form a liquid or supercritical fluid during permeating. Desirably, the pressure is such that the supercritical fluid is formed for at least some portion of the permeation (typically at least about 50%, 75% or 90%), with it being useful to have essentially the entirety of the crystallizing time be at a pressure where the carbon dioxide is a supercritical fluid other than the time it takes to reach said pressure after loading the reactor and after removing the carbon dioxide (recovering the crystalized polymer from the reactor). Other reactor conditions may also be useful such as varying the conditions such that carbon dioxide cycles between liquid and supercritical fluid carbon dioxide.

The crystallizing temperature may vary over a wide range so long as liquid or supercritical fluid carbon dioxide is formed during a portion of the crystallizing time as described in the previous paragraph. Because, in many instances it may useful to maintain the polymer in a segregated state for subsequent formation into a powder and ease in handling, the crystallizing temperature is typically less than the Tm (it is understood that amorphous polymers do not have a Tm per se, but the temperature is such: segregation of the polymer in the reactor is lost in the necessary time to induce crystallization) of the crystallizable polymer to above its Tg. Illustratively the temperature may range from 100° C. to 350° C. and more commonly 125° C. or 150° C. to 300° C. or 250° C.

The crystallizing time may be any useful time to realize the desired crystallization of the crystallizable polymer (e.g., 5 minutes, 10 minutes, 30 minutes, 1 or 2 hours to 12 or 24 hours). Typically, this means there is an increase in crystallinity of at least about 2%, 5% or 10% to fully crystallized if possible. Generally, the induced crystallized polymer has a useful crystallinity for the floating powder additive manufacturing methods described herein. Illustratively the induced crystallized polymer has a crystallinity of at least 5%, 10%, 15% or 20% by weight to essentially crystalline, with higher degrees of or 30% to essentially crystalline, 90%, 80%, 75%, 60% or 55%. The crystallinity may be determined by any suitable methods such as those known in the art. Illustratively, the percent crystallinity may be determined by x-ray diffraction including, for example, wide angle x-ray diffraction (WAXD), such as by using a Rigaku SmartLab x-ray diffractometer, or by differential scanning calorimetry (DSC), such as by using a TA Instruments DSC250 differential scanning calorimeter (ASTM D3418-15). The onset of the Tg, Tm and Tc peaks likewise are determined as per ASTM D3418 (i.e., deviation of the scan from linear). It is understood that amorphous means that the polymer essentially fails to display crystallinity in X-ray diffraction pattern or fails to display a melt peak in DSC. Herein, DSC is run at a heat rate of 20° C./min unless otherwise specified.

Agitation of the crystallizable polymer before, during and after permeating may be used.

In addition to inducing crystallization, the method may also be used to permeate compounds dissolvable in liquid or supercritical fluid carbon dioxide (dissoluble additives) into the crystallizable powder that remains after removing the carbon dioxide. For example, dissoluble additives may include monomers or prepolymers. These monomers and prepolymers may then be polymerized, for example, during the additive manufacturing of articles. Other dissoluble additives may include a UV stabilizer, lubricant, plasticizer, pigment, flow aid, and flame retardant. The amount of additives after removing the carbon dioxide incorporated into the induced crystallized polymer may be an amount useful for additive manufacturing powders. Typically, the amount is from 0.1% to 10% by weight of the polymer and dissoluble additives.

During permeating a solvent other than the carbon dioxide liquid or supercritical fluid may be added, for example, to accelerate the crystallization. Desirably, no other solvent is used allowing for the production of induced crystallized polymers having an undetectable amount of volatile organic compounds (solvent) including those typically used to dissolve and induce crystallization in the crystallizable polymers. Illustrations, of VOCs or solvents that may be useful include polar protic and polar aprotic solvents with examples being formaldehyde, d-Limonene, toluene, acetone, ethanol (ethyl alcohol) 2-propanol (isopropyl alcohol), and hexanal. Undetectable essentially means below the detection limits of gas chromatography coupled with a mass spectrometry commonly referred to as GC-mass spec and typically is at most one part per billion (ppb).

As described above the induced crystallized polymer may be formed into the induced crystalized polymer particles. Desirably, the induced crystalized polymer particles having the particle size and distribution described above. Likewise, it is desirable for induced crystalized polymer particles to have a morphology allowing for it to be additive manufactured in the absence of a flow aid. Desirably, the particles have a sphericity in terms of particle shape, and in particular particle roundness, which aids in flowability, and as derived from micrograph images of individual particles, may be expressed in terms of circular character, or circularity, where individual particle circularity is defined as the $4\ nA/P^2$, where A is the area of the particle and P is the perimeter length of the particle, both as viewed from a random perspective. Sphericity, a related parameter, is derived as the square root of circularity. Circularity is a numerical value greater than zero and less than or equal to one. A perfectly circular particle is referred to as having a circularity of 1.00. Tables of population circularity data are represented in such a way that various levels of circularity (e.g., 0.65, 0.75, 0.85, 0.90, and 0.95) are accompanied by percentages of the particle sample population with a circularity greater than the tabulated value. Particle size and shape can be measured by any suitable methods known in the art to measure particle size by diameter. In some embodiments, the particle size and shape are determined by laser diffraction as is known in the art. For example, particle size can be determined using a laser diffractometer such as the Microtrac 53500 with static image analysis accessory using PartAnSl software to analyze the captured images of the particles. Desirably, at least about 65%, 75% or 80% of the particles (by number) have a circularity that is at least about 0.6, 0.75, 0.8 or 0.85.

Desirably, the induced crystallized polymer particles have a flowability of at least about 0.5 g/s, 1 g/s or 2 g/s to any practically achievable rate (e.g., 50 g/s) using a 15-mm nozzle as determined by Method A of ASTM D 1895 with or without addition of a flow aid (e.g., AEROSIL 200).

Insoluble additives (e.g., fillers) may be incorporated in the crystallizable polymer prior to permeating the carbon dioxide. Illustrations of filler include ceramics, metals, carbon (e.g., graphite, carbon black, graphene), polymeric particulates that do not melt or decompose at the printing temperatures (e.g., cross-linked polymeric particulates, vulcanized rubber particulates and the like), plant based fillers (e.g., wood, nutshell, grain and rice hull flours or particles). Exemplary fillers include calcium carbonate, talc, silica, wollastonite, clay, calcium sulfate, mica, inorganic glass (e.g., silica, alumino-silicate, borosilicate, alkali alumino silicate and the like), oxides (e.g., alumina, zirconia, magnesia, silica "quartz", and calcia), carbides (e.g., boron carbide and silicon carbide), nitrides (e.g., silicon nitride, aluminum nitride), combinations of oxynitride, oxycarbides, or combination thereof. In certain embodiments, the filler comprises an acicular filler such as talc, clay minerals, chopped inorganic glass, metal, or carbon fibers, mullite, mica, wollastonite or combination thereof. In a particular embodiment, the filler is comprised of talc.

The induced crystallized polymer particles may be made into a body by an additive manufacturing method such as SLS, MJF, HSS or electrophotography. Illustratively, in SLS, a layer of the induced crystallized polymer particles may be deposited on a bed at a fixed temperature below the melting temperature of the induced crystalline polymer particles and a predetermined (selected) area of the bed is sintered (fused) together using a heating source such as a laser controlled and directed as described above. Layers are then in succession deposited and sintered to the preceding layer and within the layer to build up an additive manufactured part.

Surprisingly, the induced crystalline polymer particles made from amorphous crystallizable polymers when heated to bond to form the additive manufactured article will revert to being amorphous upon cooling to room temperature through Tg. Typically, the "operating window" for additive manufacturing semicrystalline thermoplastic polymers is the temperature difference between the onset temperature at which the material melts to the onset temperature at which it recrystallizes ("$T_c$"), which should be as large as possible. As described the induced crystalized polymer particles may be display an operating window anywhere from 10° C., 15° C., or 20° C. to 60° C., 50° C., 30° C., or 25° C.

The induced crystalized polymer particles may be reused without further treatments after being printed by powder additive manufacturing methods that involve heating and maintaining the bed of powder just below the onset melt temperature of the polymer particles. If desired the recycled powder may be mixed with any of the freshly made induced crystalized polymer particles (i.e., not yet been additive manufactured) to realize desired printability characteristics or part properties. The proportion of recycled induced crystalized polymer particles making up the compositions of this invention may be any amount from essentially all of the composition, 90%, 75%, 50%, 40% or 30% to about 1, 5% or 10%.

The induced crystallized polymer particles may be used to make an additive manufactured article comprised of a plurality of fused induced crystalized polymer particles. In particular, the compositions may be used to make additive manufactured articles made by the sequential selective heating of powder layers that fuse the particles within and between the layers such as in SLS, HSS and MJF.

It has also been discovered that polymers such as those described herein and polymers that may or may not be crystallizable may be contacted with liquid or super critical carbon dioxide as described herein to extract undesired contaminants arising for example from forming the polymer or shaping the polymer into a useful article (e.g., 3D manufactured or some other shaping technique such as injection molded). Such other polymers that are not crystallizable that may potentially be purified by the contacting with liquid carbon dioxide or supercritical fluid carbon dioxide may be any suitable thermoplastic polymer such as those known in the art (e.g., polyurethane, fluoropolymers, polyacrylics, polystyrene, polyolefins or copolymers thereof).

Such contaminants may be any of those used to make the polymer or form it into an article that may be entrained and extracted from the polymer by liquid or supercritical fluid carbon dioxide. Typically, the contaminant is a liquid or gas at the conditions used to form the supercritical carbon dioxide. Examples, of contaminants include, plasticizers, lubricants (e.g., oils, stearates), solvents (such as described herein for VOCs and precipitation solvents), residual monomers, ignition resistant additives, stabilizers, colorants, antioxidants, antistats, enhancers, and mold releases When the article is an article formed from the induced crystalized polymer such as a 3D printed article described herein, the article may be contacted with liquid carbon dioxide or supercritical fluid carbon dioxide as described herein to induce crystallinity in a portion or all of the article so contacted. For example, the article may be contacted to form a crystalline layer penetrating from the outer surface into the interior of the article (i.e., bulk) enabling the modification of a property of the surface of the article such as improved wear, abrasion or frictional property (e.g., tribological characteristic). Outer surface is as commonly understood to mean a surface that wetted by a liquid without diffusion into and through the polymer. Typically, the depth of such layer may be any useful depth and as an illustration may be a fraction of a 1 mm (e.g., 1 micrometer, 10 micrometer or 100 micrometer), 1 mm, to any useful depth such as 10 or 20 mm and may depend on the size of the article being treated. The layer depth may vary at differing places of the outer surface. For example, a portion of the surface may be masked when exposing to the carbon dioxide reducing or eliminating the layer from that portion of the outer surfaced masked. The layer may have a gradient of crystallinity, for example, the crystallinity may be higher at the surface decreasing to the interior crystallinity, thus defining the depth of the layer. Desirably, the layer has a uniform depth on all of the outer surface. Generally, the amount of the volume of the article that has undergone induced crystallization may be any amount but typically is at least 1%, 2%, 5%, 10% to 50%, 75%, 90% to essentially 100% by volume. The degree of crystallization may be any suitable, such as described herein for the induced crystallized polymer.

The amount of treatment time, pressure and temperature when contacting the formed polymer article may be any suitable therefor such as described herein when forming the induced crystallized polymer. Such treatment time may be any that realizes the desired crystallization or extraction of contaminants. Desirably, the amount of contaminants is reduced by a useful amount such as a reduction of one or more contaminant by at least about 10%, 20%, 50%, 75%, 90%, 95%, 99% or essentially completely removed (e.g., less than 1 pbb by weight).

Illustrative Embodiments

Embodiment 1. A method comprises: contacting carbon dioxide and a crystallizable polymer having at least one carbonyl, sulfur oxide or sulfone group; permeating the carbon dioxide into the polymer for a crystallizing time sufficient to induce crystallization forming an induced crystalized polymer; removing the carbon dioxide; and forming induced crystalized polymer particles having a D90 particle size of at most 300 micrometers and average particle size of 1 micrometer to 100 micrometers equivalent spherical diameter.

Embodiment 2. The method of Embodiment 1, wherein the induced crystallized polymer particles have: (i) a D90 particle size of less than about 150 μm, (ii) a D10 of at least 10 μm and (iii) an average particle size of about 20 μm to about 50 μm.

Embodiment 3. The method of either Embodiment 1 or 2, wherein the crystallizing time is at least one hour to 24 hours.

Embodiment 4. The method of any one of the preceding Embodiments, wherein the crystallizable polymers is comprised of at least one of the following: polyamide, polycarbonate, polyketone, polysulfone, polyarylate, and polyimide.

Embodiment 5. The method of Embodiment 4, wherein the crystallizable polymer is comprised of an ether group.

Embodiment 6. The method of Embodiment 4 or 5, wherein the crystallizable polymer is comprised of one or more of a polyketone, polyetherketone, polyetherketoneketone, polyamide, polyimide, polysulfone, polyarylate and polysulfoxide.

Embodiment 7. The method of any one of the preceding Embodiments, wherein the crystallizable polymer is comprised of a blend of two or more polymers having a distribution of the polymers therein.

Embodiment 8. The method of Embodiment 7, wherein the distribution is essentially unchanged after inducing crystallization in the crystallizable polymer.

Embodiment 9. The method of any one of the preceding Embodiments wherein the induced crystalized polymer particles have a crystallinity of at least about 5% by volume.

Embodiment 10. The method of Embodiment 9, wherein the crystallinity is at least about 10% by volume.

Embodiment 11. The method of any one of the preceding Embodiments wherein the carbon dioxide has a second solvent dissolved therein.

Embodiment 12. The method of Embodiment 11, wherein the second solvent is an alcohol.

Embodiment 13. The method of Embodiment 12, wherein the second solvent is methanol, ethanol, isopropanol or combination thereof.

Embodiment 14. The method of any one of the preceding Embodiments wherein a dissoluble additive is dissolved in the carbon dioxide that permeates into the polymer during the crystallizing time and is incorporated into the induced crystallized polymer.

Embodiment 15. The method of Embodiment 14, wherein the dissoluble additive is comprised of one or more of a UV stabilizer, lubricant, plasticizer, pigment, flow aid, flame retardant, monomer and prepolymer.

Embodiment 16. The method of any one of the preceding Embodiments wherein the induced crystalized polymer particles are essentially free of a solvent.

Embodiment 17. The method of any one of the preceding Embodiments, wherein the particles have a flowability of at least about 0.5 g/s as determined by ASTM D 1895 using a 15 mm nozzle.

Embodiment 18. A method of forming an article comprising heating the induced crystalized polymer particles of any one of Embodiments 1 to 17 to temperature sufficient to melt and bond the induced crystallized polymer particles to form the article.

Embodiment 19. The method of Embodiment 18, wherein the method is an additive manufacturing method.

Embodiment 20. The method of Embodiment 19, wherein the additive manufacturing method is comprised of selectively fusing by directed melting of the induced crystalized polymer powder.

Embodiment 21. An article comprised of an article formed by any one of the methods of Embodiments 18 to 20.

Embodiment 22. The method of any one of Embodiments 1 to 17, wherein the permeating is performed at temperature and pressure where the carbon dioxide is a liquid or supercritical fluid.

Embodiment 23. The method of Embodiment 22, wherein the carbon dioxide is the supercritical fluid for at least a portion of the crystallizing time.

Embodiment 24. A polymer comprised of a semi-crystalline polymer having: (i) an undetectable amount of a volatile organic compound, (ii) at least one carbonyl, sulfur oxide or sulfone group, wherein, upon heating the semi-crystalline polymer above its melt temperature it forms an amorphous polymer upon cooling below its glass transition temperature.

Embodiment 25. The polymer of Embodiment 24, wherein the semi-crystalline polymer has an amount of crystallinity of at least 10% by volume.

Embodiment 26. The polymer of Embodiment 25, wherein the semi-crystalline polymer is comprised of a blend of two or more different semi-crystalline polymers, wherein upon heating above their melt temperatures and cooling below their glass transition temperatures they form amorphous polymers.

Embodiment 27. The method of any one of Embodiments 18 to 20, wherein the method is further comprised of contacting the article with liquid carbon dioxide, super critical fluid carbon dioxide or combination thereof for a treatment time.

Embodiment 28. The method of Embodiment 27, wherein the treatment time is 5 minutes to 24 hours.

Embodiment 29. The method of either Embodiment 27 or 28, wherein the article has an outer surface and an interior such that after contacting a layer is formed extending from the outer surface into the interior, wherein the layer has a degree of crystallinity that is higher than the interior of the article.

Embodiment 30. The method of Embodiment 29, wherein the layer has a degree of crystallinity that is at least 5% greater than the degree of crystallinity in the interior.

Embodiment 31. The method of Embodiment 29, wherein the layer is at least 5% crystalline by volume and the interior is essentially amorphous.

Embodiment 32. An additive manufactured article comprising a plurality of polymer layers fused together, wherein the article has an interior, an outer surface, and a layer extending from the outer surface into the interior for a depth, wherein the layer has a crystallinity that is greater than the crystallinity of the interior.

Embodiment 33. The additive manufactured article of Embodiment 32, wherein the interior is amorphous and the layer has a crystallinity of at least about 5% by volume.

Embodiment 34. The additive manufactured article of either Embodiment 32 or 33, wherein the layer has depth of at least 1 mm to 20 mm.

Embodiment 35. The additive manufactured article of Embodiment 34, wherein the layer has a gradient of crystallinity with the crystallinity being highest at the outer surface to essentially equivalent to the interior crystallinity.

Embodiment 36. A method of removing contaminants from a polymer article, comprising contacting carbon dioxide and the polymer article; permeating the carbon dioxide into the polymer for a treatment time sufficient to extract a contaminant and removing the carbon dioxide and contaminant.

Embodiment 37. The method of Embodiment 36, wherein the contaminant is a plasticizer, lubricant, solvent, residual monomer, ignition resistant additive, stabilizer, colorant, antioxidant, antistat, mold release or combination thereof.

Embodiment 38. The method of Embodiment 37, wherein the lubricant is an oil.

Embodiment 39. The method of either Embodiment 37 or 38, wherein the contaminant is reduced by at least 50%.

Examples

Figure 14A:
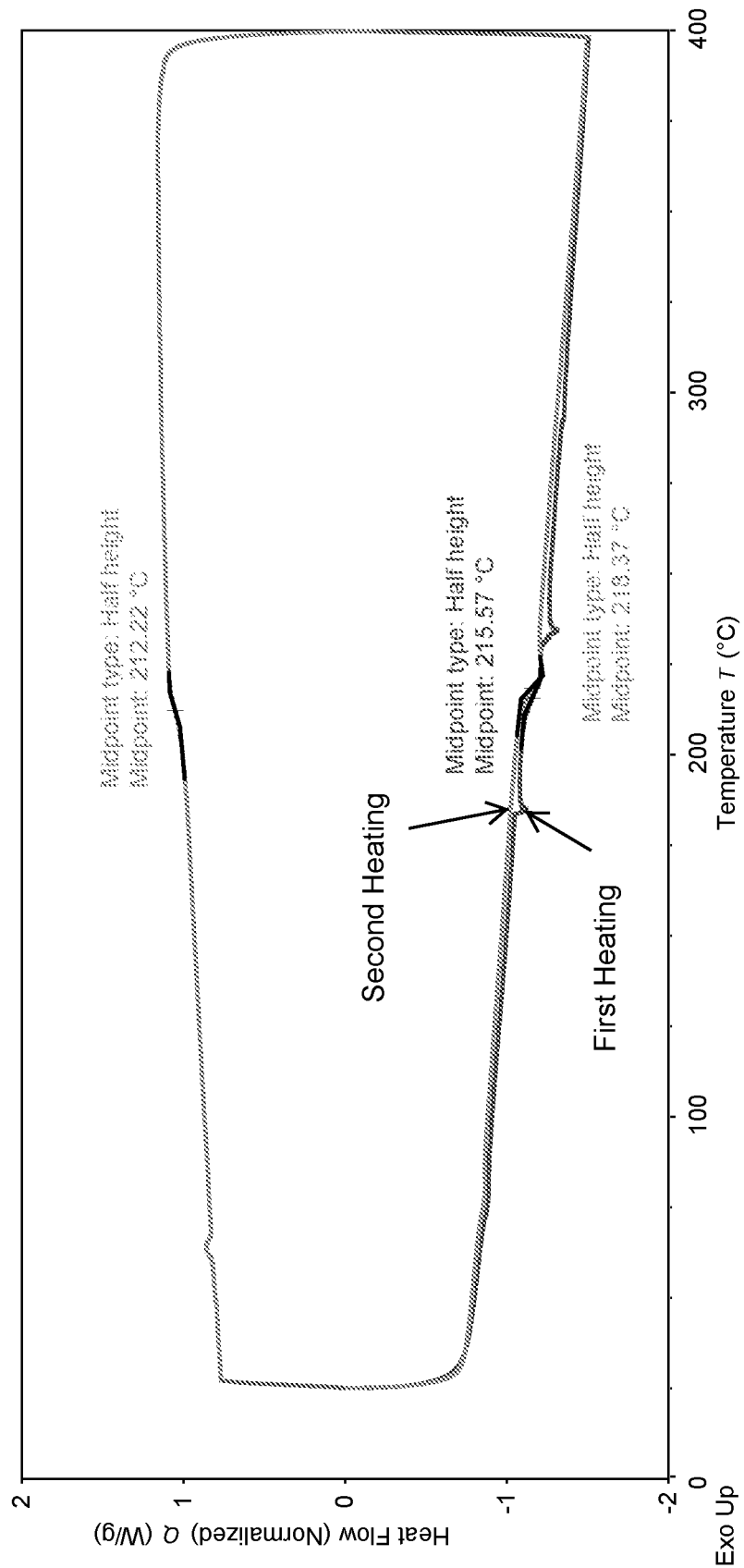
FIG. 14A is a DSC plot of a crystallizable polymer prior to being subjected to the method of this invention.
Figure 14B:
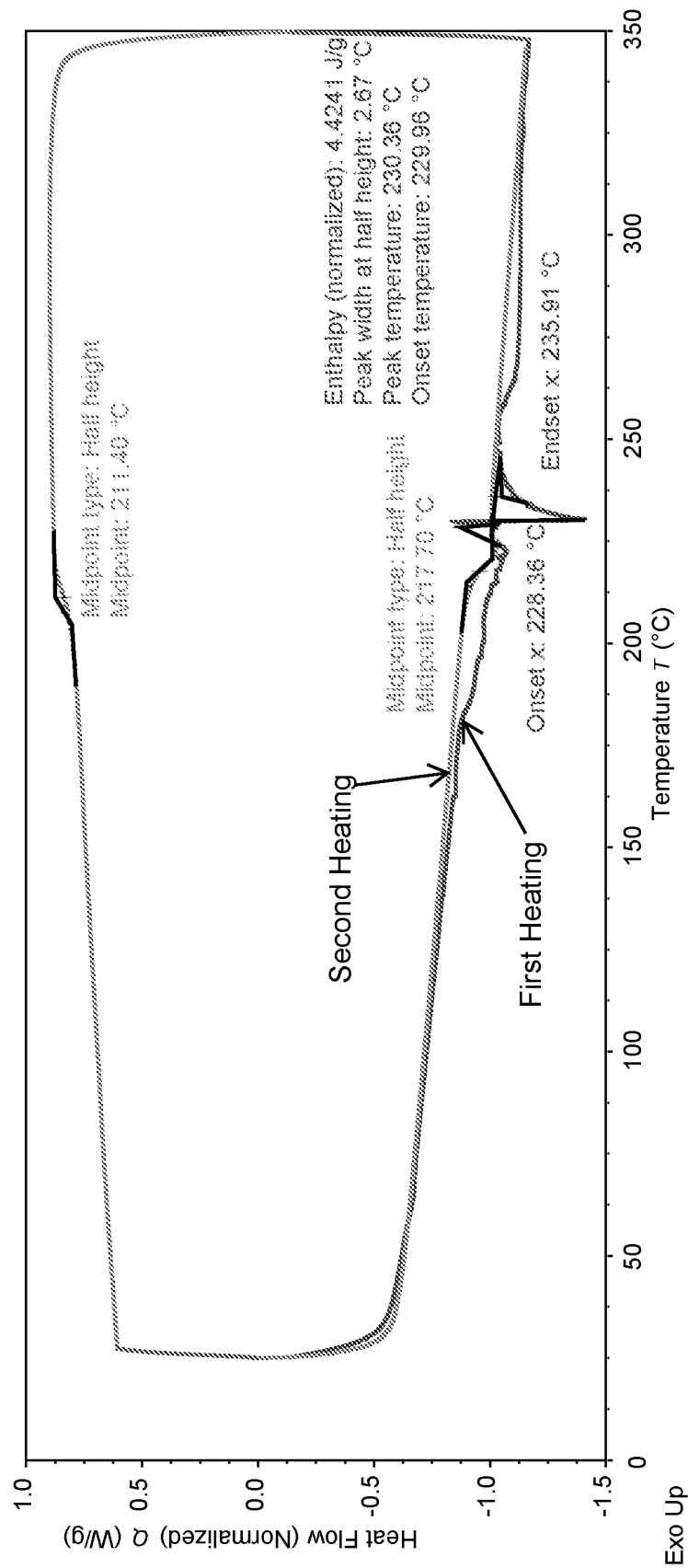
FIG. 14B is a DSC plot of the crystallizable polymer of FIG. 14A subjected to the method of this invention.

For all of the Examples, each of the polymers shown in Table 1 is contacted with carbon dioxide by heating to 150° C. and pressurizing to 204 bar, maintaining at these conditions for 4 hours and then cooling removing the carbon dioxide. DSC curves of each polymer is run at 20° C./min before induction of crystallization by the method and after induction of crystallization by the method. For each amorphous polymer (Examples 1 to 13), the DSC curve prior to the method displays essentially no melt peak upon heating or crystallization peak upon cooling and is not shown. From the DSC curves for each of the amorphous crystallizable polymers, there is induction of crystallization on the first heating and essentially no crystallization peak upon cooling (upper curve) or melt peak upon heating again. Each DSC Figure number corresponds with the Example number. And for the semi-crystalline polyetherimide of Example 14, the crystallinity has increased as evident by the greater area of the melt peak upon the initial heating in the DSC curve (FIG. 14B) after performing the method compared to heating the polymer prior to performing the method (FIG. 14B).

TABLE 1

| Ex. | Polymer Type | CAS-No. | Tradename | Supplier |
| --- | --- | --- | --- | --- |
| 1 | Polycarbonate | 103598-77-2 | LUPOY 1303EP 22 | LG Chem |
| 2 | Polyamide | 163800-67-7 | TR 90 | EMS-Grivory |
| 3 | Polyetherketoneketone | 1610365-05-3 | KEPSTAN 6003 | Arkema |
| 4 | Polyamide | 79331-75-2 | TR-55 | EMS-Grivory |
| 5 | Polysulfone | 25135-51-7 | UDEL P-3703 NT 11 | Solvay |
| 6 | Polysulfone | 25154-01-2 | UDEL P-1700 | Solvay |
| 7 | Polyarylate | 26590-50-1 | UPOLYMER U100 | Unitika |
| 8 | Polysulfone | 25839-81-0 | ULTRASON P2010 | BASF |
| 9 | Polysulfone | 1685240-40-7 | VERADEL 3600 | Solvay |
| 10 | Polysulfone | 941281-50-1 | RADEL R5800 | Solvay |
| 11 | Polysulfone | 1352053-93-0 | VERADEL A-201 | Solvay |
| 12 | Polyimide | 58698-66-1 | EXTEM VH1003 | Sabic |
| 13 | Polycarbonate | 214353-24-9 | LEXAN ML3729R | Sabic |
| 14 | Polyetherimide | 61128-24-3 | ULTEM 1010 | Sabic |

What is claimed is:

1. A polymer comprised of a semi-crystalline polymer having: (i) an undetectable amount of a volatile organic compound, (ii) at least one carbonyl, sulfur oxide or sulfone group, wherein, upon heating the semi-crystalline polymer above its melt temperature it forms an amorphous polymer upon cooling below its glass transition temperature, wherein the semi-crystalline polymer has an amount of crystallinity of at least 10% by volume.

2. The polymer of claim 1, wherein the semi-crystalline polymer is comprised of a blend of two or more different semi-crystalline polymers, wherein upon heating above their melt temperatures and cooling below their glass transition temperatures they form amorphous polymers.

3. The polymer of claim 1, wherein the semi-crystalline polymer is comprised of particles having a median particle size of 1 micrometer to 100 micrometers by volume.

4. The polymer of claim 3, wherein the particles have $D_{90}$ of at most 300 μm, and a $D_{10}$ of at least 0.1 μm by volume.

5. The polymer of claim 3, wherein the semicrystalline polymer has an operating window of at least 10° C.

6. The polymer of claim 3, wherein at least 65% of the particles by number have a circularity of at least 0.75.

7. The polymer of claim 6, wherein the particles have a flowability of at least 0.5 g/s.

8. The polymer of claim 7, wherein the particles are further comprised of an insoluble additive.

9. The polymer of claim 1, wherein the semi-crystalline polymer is comprised of one or more of a polyketone, polyetherketone, polyetherketoneketone, polyamide, polyimide, polysulfone, polyarylate and polysulfoxide.

10. The polymer of claim 1, wherein the semi-crystalline polymer is further comprised of a dissoluble additive.

11. The polymer of claim 10, wherein the dissoluble additive is comprised of one or more of a monomer, pre-polymer, UV stabilizer, lubricant, plasticizer, pigment, flow aid, and flame retardant.

12. The polymer of claim 11, wherein the dissoluble additive is present in an amount of 0.1% to 10% by weight of the semi-crystalline polymer.

13. The polymer of claim 11, wherein the amount of crystallinity is at least 20% to essentially crystalline.

14. A polymer comprised of a semi-crystalline polymer having: (i) an undetectable amount of a volatile organic compound, (ii) at least one carbonyl, sulfur oxide or sulfone group, wherein, upon heating the semi-crystalline polymer above its melt temperature it forms an amorphous polymer upon cooling below its glass transition temperature, wherein the semi-crystalline polymer is comprised of particles having a median particle size of 1 micrometer to 100 micrometers by volume.

15. The polymer of claim 14, wherein the semi-crystalline polymer is further comprised of a dissoluble additive.

16. The polymer of claim 15, wherein the semi-crystalline polymer is further comprised of an insoluble additive.

17. A polymer comprised of a semi-crystalline polymer having: (i) an undetectable amount of a volatile organic compound, (ii) at least one carbonyl, sulfur oxide or sulfone group, wherein, upon heating the semi-crystalline polymer above its melt temperature it forms an amorphous polymer upon cooling below its glass transition temperature, wherein the semi-crystalline polymer is comprised of one or more of a polyketone, polyetherketone, polyetherketoneketone, polyamide, polyimide, polysulfone, polyarylate and polysulfoxide.

18. The polymer of claim 17, wherein the semicrystalline polymer has an operating window of at least 10° C.

* * * * *